United States Patent
Saini et al.

(10) Patent No.: US 11,485,900 B2
(45) Date of Patent: Nov. 1, 2022

(54) MITIGATION OF CONDENSATE AND WATER BANKING USING FUNCTIONALIZED NANOPARTICLES

(71) Applicant: Saudi Arabian Oil Company, Dhahran (SA)

(72) Inventors: Rajesh Kumar Saini, Cypress, TX (US); Mohammed Sayed, Houston, TX (US); Hooisweng Ow, Woburn, MA (US); Mohammad Haque, Houston, TX (US); Amy J. Cairns, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 150 days.

(21) Appl. No.: 16/732,581

(22) Filed: Jan. 2, 2020

(65) Prior Publication Data

US 2020/0231864 A1 Jul. 23, 2020

Related U.S. Application Data

(60) Provisional application No. 62/795,787, filed on Jan. 23, 2019.

(51) Int. Cl.
| | |
|---|---|
| *E21B 43/12* | (2006.01) |
| *C09K 8/588* | (2006.01) |
| *C09K 8/84* | (2006.01) |
| *C09K 8/88* | (2006.01) |
| *C09K 8/60* | (2006.01) |

(52) U.S. Cl.
CPC .............. *C09K 8/588* (2013.01); *C09K 8/845* (2013.01); *C09K 8/88* (2013.01); *C09K 8/607* (2013.01); *C09K 2208/10* (2013.01); *C09K 2208/22* (2013.01)

(58) Field of Classification Search
CPC .......... C09K 8/845; C09K 8/588; E21B 43/12
USPC ......................................................... 166/279
See application file for complete search history.

(56) References Cited

U.S. PATENT DOCUMENTS

| | | | |
|---|---|---|---|
| 4,366,071 | A | 12/1982 | McLaughlin et al. |
| 6,559,087 | B1 | 5/2003 | De Lange et al. |
| 6,683,022 | B1 | 1/2004 | De Lange et al. |
| 6,865,939 | B2 | 3/2005 | Kirby et al. |
| 7,029,507 | B2 | 4/2006 | Yadav et al. |

(Continued)

FOREIGN PATENT DOCUMENTS

| | | |
|---|---|---|
| WO | WO-98/50945 A2 | 11/1998 |
| WO | WO-2010/009182 A2 | 1/2010 |

(Continued)

OTHER PUBLICATIONS

PHPA/Polyacrylamide, Yixing Bluwat Chemicals Co. Ltd., <https://www.bluwatchina.com/phpa-polyacrylamide.html>. Retreived on Sep. 9, 2020.

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

The present application relates to methods and systems for mitigating condensate banking. In some embodiments, the methods and systems involve altering the wettability of a rock formation in the vicinity of a wellbore for a gas condensate reservoir.

20 Claims, 10 Drawing Sheets

∼∼∼ Low surface energy groups

⸻R Group with the anchoring terminal group

(56) References Cited

U.S. PATENT DOCUMENTS

| | | |
|---|---|---|
| 8,252,778 B2 | 8/2012 | Yu et al. |
| 8,680,179 B2 | 3/2014 | Hino et al. |
| 9,245,848 B2 | 1/2016 | Duong et al. |
| 9,296,839 B2 | 3/2016 | Venema et al. |
| 9,587,307 B2 | 3/2017 | Haukka et al. |
| 10,442,983 B2 | 10/2019 | Sayed et al. |
| 11,015,111 B2 | 5/2021 | Sayed et al. |
| 2004/0157749 A1* | 8/2004 | Ely ............... C09K 8/575 507/200 |
| 2007/0029085 A1 | 2/2007 | Panga et al. |
| 2007/0207068 A1 | 9/2007 | Lange et al. |
| 2007/0249164 A1 | 10/2007 | Chen et al. |
| 2008/0157665 A1 | 7/2008 | Wu et al. |
| 2009/0004462 A1 | 1/2009 | Zhang et al. |
| 2009/0130412 A1 | 5/2009 | Hatton et al. |
| 2009/0317621 A1 | 12/2009 | Youngblood et al. |
| 2010/0096139 A1 | 4/2010 | Holcomb et al. |
| 2010/0224361 A1 | 9/2010 | Pope et al. |
| 2010/0285999 A1 | 11/2010 | Norman et al. |
| 2011/0003402 A1 | 1/2011 | Chakrapani et al. |
| 2011/0053810 A1* | 3/2011 | Norman ............ C09K 8/035 507/205 |
| 2012/0004146 A1 | 1/2012 | Van Zanten et al. |
| 2012/0128882 A1 | 5/2012 | Mirkin et al. |
| 2012/0175120 A1 | 7/2012 | Holcomb et al. |
| 2012/0322697 A1* | 12/2012 | Zhang ............ C09K 8/575 507/205 |
| 2013/0081812 A1* | 4/2013 | Green ............ C09K 8/805 166/280.1 |
| 2014/0238263 A1 | 8/2014 | Scheonfisch et al. |
| 2015/0315455 A1 | 11/2015 | Sayed et al. |
| 2015/0322272 A1 | 11/2015 | Pokroy et al. |
| 2016/0114325 A1 | 4/2016 | Tang et al. |
| 2016/0168449 A1 | 6/2016 | Al-Muntasheri et al. |
| 2016/0357101 A1 | 12/2016 | Mirkin et al. |
| 2017/0000119 A1 | 1/2017 | Nassar et al. |
| 2018/0086971 A1 | 3/2018 | Al-Muntasheri et al. |
| 2018/0244985 A1* | 8/2018 | Almohsin ............ C09K 8/845 |
| 2019/0023973 A1 | 1/2019 | Sayed et al. |
| 2020/0024505 A1 | 1/2020 | Sayed et al. |

FOREIGN PATENT DOCUMENTS

| | | |
|---|---|---|
| WO | WO-2011/001036 A1 | 1/2011 |
| WO | WO-2011/086361 A1 | 7/2011 |
| WO | WO-2013/071212 A1 | 5/2013 |
| WO | WO-2015/171596 A1 | 11/2015 |
| WO | WO-2016/073658 A1 | 5/2016 |
| WO | WO-2016/090368 A1 | 6/2016 |
| WO | WO-2019/018507 A1 | 1/2019 |
| WO | WO-2020/154063 A1 | 7/2020 |

OTHER PUBLICATIONS

Polyacrylamide, Wikipedia, <https://en.wikipedia.org/wiki/Polyacrylamide>. Retreived on Sep. 9, 2020.

Ahmadi, A. et al., Chemical Treatment To Mitigate Condensate and Water Blocking in Gas Wells in Carbonate Reservoirs, SPE Production & Operations, 67-74 (Feb. 2011).

Al-Yami, A.M. et al., A Successful Field Application of a New Chemical Treatment in a Fluid Blocked Well in Saudi Arabia, Society of Petroleum Engineers, SPE 168086: 1-8 (May 19-22, 2013).

Aminnaji, M. et al., Wettability Alternation of Reservoir Rocks from Liquid Wetting to Gas Wetting Using Nanofluid, Transp. Porous Med., 109:201-216 (2015).

Arkles, B., Silane Coupling Agents: Connecting Across Boundaries, Gelest Brochure, 76 pages (2010).

Blaaderen, A. Van and Vrij, A., Synthesis and Characterization of Monodisperse Colloidal Organo-silica Spheres, Jrnl. Coll. Inter. Sci., 156:1-18 (1993).

Choi, H. and Chen, I.W., Surface-modified silica colloid for diagnostic imaging, J. Coll. Inter. Sci., 258:435-437 (2003).

Esmaeilzadeh, P. et al., Wettability Alteration of Carbonate Rocks from Liquid-Wetting to Ultra Gas-Wetting Using $TiO_2$, $SiO_2$ and CNT Nanofluids Containing Fluorochemocals, for Enhanced Gas Recovery, J. Natural Gas Science and Engineering, 26:1294-1305 (2015).

Fahes, M. et al., Wettability Alteration to Intermediate Gas-Wetting in Gas-Condensate Reservoirs at High Temperatures, SPE Journal, 397-407 (2007).

International Search Report for PCT/US2018/042657, 6 pages (dated Oct. 15, 2018).

Karandish, G.R. et al., Wettability alteration in gas-condensate carbonate reservoir using anionic fluorinated treatment, Chemical Engineering Research and Design, 93:554-564 (Feb. 2015).

Krüss, Models for Surface Free Energy Calculation, Technical Note, 8 pages (1999), <https://www.kruss-scientific.com/fileadmin/user_upload/website/literature/kruss-tn306-en.pdf>. Retreived on Mar. 2, 2020.

Li, K. et al., Phenomenological Modeling of Critical Condensate Saturation and Relative Permeabilities in Gas/Condensate Systems, SPE Journal, 5(20):138-147 (Jun. 2000).

Mousavi, M.A. et al., Synthesis of fluorinated nano-silica and its application in wettability alteration near-wellbore region in gas condensate reservoirs, Journal of Applied Surface Science, 273:205-214 (2013).

Ni, X. et al., Synthesis of an Amphiphobic Nanofluid with a Novel Structure and Its Wettability Alteration on Low-Permeability Sandstone Reservoirs, Engery & Fuels, 32:4747-4753 (2018).

Noh, M. et al., Wettability Alteration in Gas-Condensate Reservoirs To Mitigate Well Deliverability Loss by Water Blocking, SPE Reservoir Evaluation & Engineering, 676-685 (Aug. 2008).

Nozawa, K. et al., Smart control of monodisperse Stöber silica particles: effect of reactant addition rate on growth process, Langmuir, 21(4):1516-23 (2005).

Sayed, M. et al., A Safer Generation of Wettability Alteration Chemical Treatments, SPE International Conference on Oilfield Chemistry, SPE-184566-MS, 1-25 (Apr. 3-5, 2017).

Shimura, N. and Ogawa, M., Preparation of surfactant templated nanoporous silica spherical particles by the Stöber method. Effect of solvent composition on the particle size, J. Mater. Sci., 42:5299-5306 (2007).

Stöber, W. et al., Controlled growth of monodisperse silica spheres in the micron size range, Jrnl. Coll. Inter. Sci., 26:62-69 (1968).

Wang, X. D. et al., Preparation of spherical silica particles by Stöber process with high concentration of tetra-ethyl-orthosilicate, Jrnl. Coll. Inter. Sci. 341:23-29 (2010).

Written Opinion for PCT/US2018/042657, 8 pages (dated Oct. 15, 2018).

International Search Report for PCT/US2019/068288, 4 pages (dated Mar. 23, 2020).

Written Opinion for PCT/US2019/068288, 9 pages (dated Mar. 23, 2020).

* cited by examiner

MITIGATION OF CONDENSATE AND WATER BANKING USING FUNCTIONALIZED NANOPARTICLES

CROSS-REFERENCE TO RELATED APPLICATIONS

This application claims priority to U.S. Provisional Application No. 62/795,787, filed Jan. 23, 2019, the entirety of which is incorporated herein by reference.

FIELD

The present application relates generally to methods and systems for mitigating condensate banking.

BACKGROUND

Gas condensate reservoirs contain an appreciable amount of gas and condensate reserves that are vital for the increasing global demand for energy resources. In gas condensate reservoirs, the initial reservoir pressure is usually greater than the dew point pressure where there is only one phase in the reservoir, namely a gas phase. During production, the bottom hole pressure in the production well eventually falls less than the dew point pressure. As a result, heavy hydrocarbons (for example, hydrocarbons having the molecular weight of greater than 30 g/mol) are condensed to a liquid phase. This liquid phase commonly accumulates in pore spaces in the area close to the wellbore, resulting in what is commonly known as "condensate banking." The condensate is trapped by capillary forces or is retained in the rock as a result of poor liquid mobility. This condensate blockage around the wellbore can cause a reduction in the productivity of the well by a factor of two or more.

In gas wells, water that accumulates near the wellbore can also decrease the productivity of gas. The sources for water accumulation could be filtrate water from drilling mud, cross flow of water from water-bearing zones, water from completion or workover operations, water from matrix/fracture treatments, water from emulsions, etc. The problem of productivity decline because of an increase in near wellbore water saturation is known as water block. Water blocks and condensate banks can occur together or independently, leading to a decrease in well productivity and in some cases to complete shut down in production. Several techniques have been developed in an attempt to alleviate condensate and water banking. One technique involves keeping the reservoir pressure greater than the dew point by recycling gas. However, recyclable gas volume is limited and this method cannot always keep the reservoir pressure high enough. Other approaches include drilling horizontal wells and hydraulic fracturing. These temporary solutions are costly as they require drilling rigs. Wettability alteration methods have also been developed to reduce condensate banking, which typically involves fluorinated polymers and surfactants in alcohol-based solvents. However, the wettability alteration is based on the Van der Waals attraction force; as such it wears off as time goes by. In some cases, it can be an ionic interaction between a surfactant or polymer groups, for example, a fluoropolymer is acrylate based with fluoro groups. The acrylate group has a carboxylate group that can interact. In some cases, the solubility can be modified to keep the treatment and wettability for a longer time, but eventually the treatment will wear off or be washed away with time. Accordingly, a more permanent treatment, or at least one that will last longer than the current treatment, is needed. There is, therefore, a need for improved methods and systems for mitigating condensate banking. In some cases it can both be ionic and Van der Waals interactions.

SUMMARY

The present application provides strategies for mitigating condensate banking in the vicinity of wellbores. Embodiments of the present application include methods and systems that are used to alter the wettability of a rock formation and thereby mitigate condensate banking. In some embodiments, the methods involve chemical modifications of the rock formation using functionalized particles (for example, nanoparticles) in combination with morphological modifications of the rock formation. In some embodiments, the methods include particles functionalized with a chemical moiety (R) that can react with a chemical moiety (R') on the surface of a rock formation to form a covalent or electrostatic bond. In some embodiments, the methods involve particles functionalized with a chemical moiety that can provide desired properties (for example, having lower surface free energy than an untreated rock formation) to the rock formation.

In one aspect, the invention relates to a method for mitigating condensate and water banking in the vicinity of a wellbore for a gas condensate reservoir. The method includes contacting a rock formation in the vicinity of a wellbore for a gas condensate reservoir with a particle suspension, wherein the particle suspension includes particles having a surface free energy lower than the rock formation before the contacting step, and the particles are functionalized with a first chemical moiety (R) that reacts with a second chemical moiety (R') on a surface of the rock formation to form at least one of a covalent bond, an electrostatic bond, or a Van der Waals bond, thereby reducing the surface energy of the formation and rock surface.

In another aspect, the invention relates to a method for mitigating condensate and water banking in the vicinity of a wellbore for a gas condensate reservoir. The method includes contacting a rock formation in the vicinity of a wellbore for a gas condensate reservoir with a particle suspension, wherein the particle suspension includes particles with a surface free energy less than 50 mJ/m2 and are functionalized with a first chemical moiety (R) that reacts with a second chemical moiety (R') on a surface of the rock formation to form at least one of a covalent bond, an electrostatic bond, or a Van der Waals bond.

In various embodiments of the foregoing aspects, the first chemical moiety (R) is selected from the group consisting of a silyl ether group, an amine group, an aromatic amine, an ammonium group, a quaternary amine group, a polyamine, a silanol, an isocynate, an epoxide, a hydroxyl, a phenol, a halogen, halosilanes, a carboxyl group, a carboxylate group, a phosphate group, a phosphonium group, a phosphonate group, a phosphine, a sulfonate group, a sulfate group, a sulfonic acid group, a pyridine group, a pyridinium group, a sulfur, a mercaptan, an aldehyde, a succinic anhydride, an ester group, a thiocynate, silyl hydrides, a methacryloxy group, an acrylamide group, an allyl group, zwitterionic groups, and combinations thereof.

The second chemical moiety (R') is selected from the group consisting of a hydroxyl group, an amine group, a metallic oxide group, metallic carbonate groups, silicate groups, a polyamine, a quaternary amine group, an epoxide, an isocynate, a silyl ether group, an aromatic amine, an ammonium group, a silanol, an isocynate, a phenol, a halogen, halosilanes, a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, an acrylamide group, an allyl group, and combinations thereof.

In various embodiments of the methods, the first chemical moiety (R) is an epoxide group and the second chemical moiety (R') is an amine group. In some cases, the first chemical moiety (R) is a silyl ether group, an amine group, quaternary amine group, pyradine group, epoxide group isocynate group aromatic amines, ammonium group, polyamine group, halogen group, halosilanes group, aldehyde group and the second chemical moiety (R') is a hydroxyl group.

In some embodiments, the method includes the step of treating the surface of the rock formation, before the step of contacting, with a solution that comprises a rock surface modifier that comprises the second chemical moiety (R'). The second chemical moiety (R') can be an amine group and the rock surface modifier can an amino-alkyl silane that reacts with hydroxyl groups on the surface of the rock formation to form a covalent bond. In some embodiments, the amino-alkyl silane is a dipodal silane.

Additionally, the first reactive moiety (R) can be an epoxide that reacts with the amine group provided by the amino-alkyl silane to form a covalent bond. The particles can be functionalized with perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H,1H,2H,2H-perfloorodecyltriethoxysilane and perfluorodecyltrichlorosilane. Alternatively or additionally, the particles are functionalized with chemical moiety L that includes a hydrophobic moiety, oleophobic moiety or omniphobic moiety. The L moiety contains at least one of group containing linear or branched alkyl containing group, alkylaryl containing group, an aromatic containing group, fluoroalkyl containing group, perfluoroalkyl containing group, organic silicon containing group or combination thereof. The hydrocarbon or alkyl chain length may include more than 5, 7, 9, 10, 12, 14, 15, 20, or 22 carbons.

In still other embodiments, the particles include inorganic metal oxides, organic particles resins, thermoplastic resins, silica, quartz, glass, titania, zirconia, germania, alumina, tantalum pentoxide, zinc oxide, carbon nanotube, graphene, carbon black, mica, graphite, talc, nanoclay, boron nitride, boron nitride nanotubes, vanadium pentaoxide, calcium carbonate, zirconium oxide, titanium oxide, silicon nitride, silicon carbide, copper, tin oxide, iron oxide, titanium oxide, chromium oxide, lead oxide, gypsum, barytes, metal organic frameworks or combinations thereof. Additionally, the particles may include organic and thermoset resins, such as cross-linked polystyrene particles, crosslinked methacrylate-based polymers particles, phenolic resin (e.g., novolac or resole), a furan resin, an epoxy resin, a polyurethane, a polyurea, or a melamine, or combinations thereof. In some embodiments, the particles include fluorinated silica particles. In some embodiments, the particles have a mean diameter in a range of about 1 nm to about 1000 nm.

In some embodiments, the rock formation is a sandstone formation, carbonate formation, shale formation, clay rich formations or a combination of thereof. The treatment can be pumped into an unpropped fracture, a propped fracture, a gravel packed completion, a reservoir matrix, or a combination of thereof.

In further embodiments, the particle suspension includes a solvent selected from the group consisting of water, brine, methanol, ethanol, isopropanol, ethylene glycol, butanol, 2-butoxyethanol, butyl carbitol, pentanol, hexanol, terpene alcohols, such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof.

In various embodiments, the treatment will involve a pre-flush treatment to prepare the rock surface to receive the nanoparticles. The preflush can include a rock surface modifier that includes the second chemical moiety (R') dispersed in a solvent selected from the group consisting of water, brine, methanol, ethanol, isopropanol, ethylene glycol, butanol, 2-butoxyethanol, butyl carbitol, pentanol, hexanol, terpene alcohols, such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof.

In other embodiments, the preflush includes a rock surface modifier that includes the second chemical moiety (R') suspended in fresh or deionized water, 2 wt % KCl, 6 wt % KCl and a solvent from the above group. The pre-flush can include one stage where R' is dispersed in solvent and/or two stages, where a combination of solvent and aqueous solutions in a ratio of 95/5, 90/10, 85/15, 80/20, 75/25, 70/30, 65/35, and 60/40 to disperse the R' followed by a solvent pre-flush that contains R'. Alternatively, the pre-flush can include two stages, wherein a combination of solvent and aqueous solutions in ratio of 95/5, 90/10, 85/15, 80/20, 75/25, 70/30, 65/35, and 60/40 followed by a solvent pre-flush contains R'.

In additional embodiments, the aqueous solution includes a chelating agent selected from the group consisting of EDTA, MGDA, GLDA, and HEDTA, or combinations thereof, in concentrations from about 0.1 wt % up to about 40 wt %. The range of the particle concentration can be from about 0.001 wt % up to about 1 wt %, or from about 0.01 wt % up to about 0.35 wt %.

In another aspect, the invention relates to a system for mitigating condensate and water banking in the vicinity of a wellbore for a gas condensate reservoir. The system includes a first container or source that includes a particle suspension, wherein the particle suspension includes particles with a surface free energy less than less than 50 mJ/m2 and are functionalized with a first chemical moiety (R) that is capable of reacting with a second chemical moiety (R') on a surface of a rock formation to form a covalent or electrostatic bond; and one or more conduits for introducing the particle suspension into the rock formation in the vicinity of a wellbore for a gas condensate reservoir. In some embodiments, the system includes a second container or source that includes a solution that includes a rock surface modifier that includes the second chemical moiety (R'); and one or more conduits for introducing the solution into the rock formation in the vicinity of the wellbore for the gas condensate reservoir.

Definitions

In order for the present application to be more readily understood, certain terms used in the present application are defined as follows. Additional definitions for the following terms and other terms may be set forth throughout the specification.

As used in this application, the term "comprise" and variations of the term, such as "comprising" and "comprises," are not intended to exclude other additives, components, integers or steps. In this application, where ranges are provided, endpoints are included. In this application, the term "a" may be understood to mean "at least one," unless otherwise clear from context.

In the vicinity of a wellbore: As used in this application, the term "in the vicinity of a wellbore" refers to an area of a rock formation in or around a wellbore. In some embodiments, "in the vicinity of a wellbore" refers to an area where condensate banking may be occurring or have the potential to occur. In some embodiments, "in the vicinity of a wellbore" refers to a distance that is less than 35 meters from a wellbore (for example, less than 30, less than 25, less than 20, less than 15, less than 10, less than 5, or less than 1 meters from a wellbore).

Nanoparticles: As used in this application, the term "nanoparticles" refers to particles that have a mean cross-section, for example, a mean diameter, of up to 1,000 nanometers (nm). In some embodiments the mean cross-section is measured by dynamic light scattering (DLS), for example, based on the scattering intensity distribution measured by photon correlation spectroscopy. In some embodiments, nanoparticles have a mean diameter of less than 300 nm, for example, a mean diameter of less than 100 nm.

Omniphobic: As used in this application, the term "omniphobic" refers to a surface that is non wetting to aqueous as well as oleic or hydrocarbon phases. In some embodiments, an omniphobic surface repels one or more liquid phases, thereby improving gas relative permeability or liquid, or both relative permeabilities.

Substantially: As used herein, the term "substantially" refers to the qualitative condition of exhibiting total or near-total extent or degree of a characteristic or property of interest.

These and other objects, along with advantages and features of the disclosed systems and methods, will become apparent through reference to the following description and the accompanying drawings. Furthermore, it is to be understood that the features of the various embodiments described are not mutually exclusive and can exist in various combinations and permutations.

BRIEF DESCRIPTION OF THE DRAWING

In the drawings, like reference characters generally refer to the same parts throughout the different views. Also, the drawings are not necessarily to scale, emphasis instead generally being placed upon illustrating the principles of the disclosed systems and methods and are not intended as limiting. For purposes of clarity, not every component may be labeled in every drawing. In the following description, various embodiments are described with reference to the following drawings, in which.

DETAILED DESCRIPTION

Figure 1:
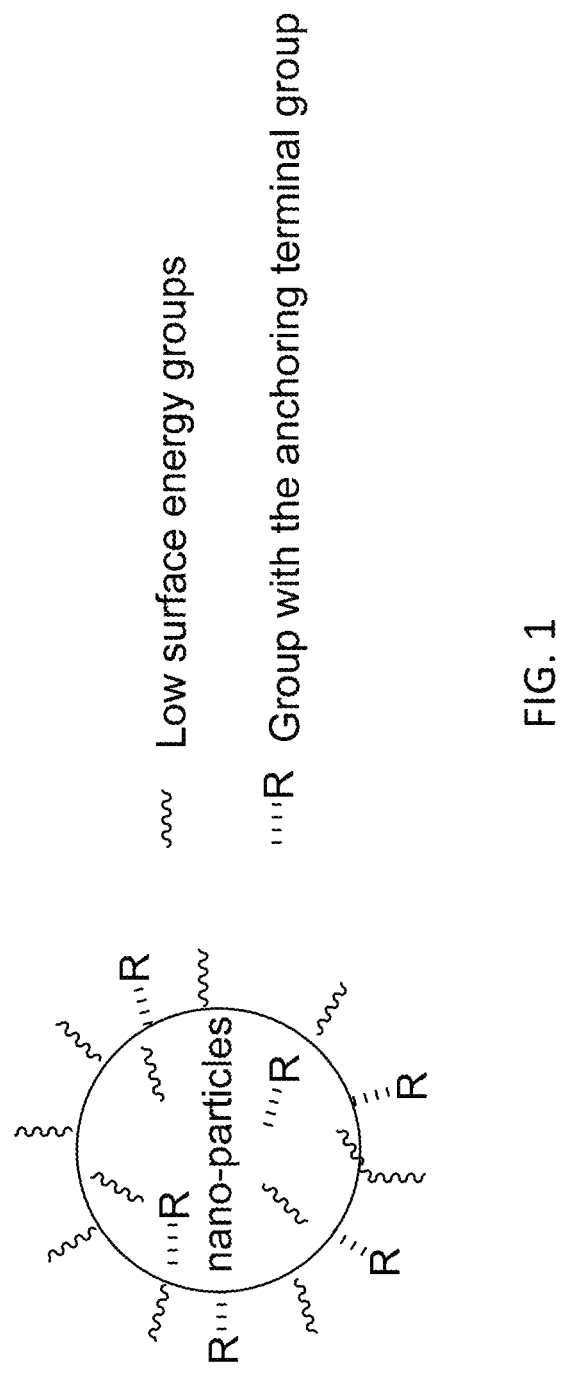
FIG. 1 illustrates an exemplary nanoparticle according to an embodiment of the instant application. The nanoparticle is functionalized with low surface free energy groups and a first chemical moiety that can react with a second chemical moiety on a rock surface.

Throughout the description, where methods are described as having, including, or comprising specific steps, or where systems are described as having, including, or comprising specific components, it is contemplated that, additionally, there are methods according to the present application that consist essentially of, or consist of, the recited processing steps, and that there are systems of the present application that consist essentially of, or consist of, the recited components.

It should be understood that the order of steps or order for performing certain actions is immaterial so long as the method or system remains operable. Moreover, two or more steps or actions may be conducted simultaneously.

The mention of any publication in the present application, for example, in the Background section, is not an admission that the publication serves as prior art with respect to any of the claims. The Background section is presented solely for purposes of clarity and is not meant as a description of prior art with respect to any claim.

The present application encompasses the insight that certain chemical treatments of a rock formation in the vicinity of a wellbore may be used to enhance gas and liquid condensate productivities from a reservoir by reducing pressure drop during gas production. Furthermore, in some embodiments, the present application provides insights that particles functionalized with certain chemical moieties can lower the surface free energy of certain rock formations by forming a covalent or electrostatic bond with the rock formation. For example, in some embodiments, the modified rock formation may have the surface free energy lower than the untreated rock formation. Alternatively or additionally, the chemical treatment reduces the wettability of the rock formation to water or oil may be reduced by providing surface roughness to the rock formation. Furthermore, the present application provides insights that particles associated via a covalent or electrostatic bond exhibit increased durability compared to conventional wettability alterations based on Van der Waals attraction force.

In some embodiments, a rock formation subjected to a chemical treatment in accordance with the methods of the present application possesses a chemical moiety that can form a covalent or electrostatic bond with other chemical moieties. In some embodiments, the rock formation is a sandstone formation. In some embodiments, the sandstone formation comprises quartz, feldspar, or clay. In some embodiments, the formation is carbonate and contains mostly calcite, dolomite, and the likes.

In some embodiments, methods provided by the present application involve particles that can create Van der Waals, covalent and/or electrostatic bonds with the rock formation.

In some embodiments, the particles are or comprise a material selected from the group consisting of metal, semi-metal (a material with a very small overlap between the bottom of the conduction band and the top of the valence band), non-metal, oxides, borides, carbides, sulfides and nitrides of the metal, semi-metal or non-metal, and combinations thereof. In some embodiments, the particles are or comprise a metal oxide. In some embodiments, the particles are or comprise silica, quartz, glass, titania, zirconia, germania, alumina, tantalum pentoxide, zinc oxide, carbon nanotube, graphene, carbon black, mica, graphite, talc, nanoclay, boron nitride, boron nitride nanotubes, vanadium pentaoxide, calcium carbonate, zirconium oxide, titanium oxide, silicon nitride, silicon carbide, copper, tin oxide, iron oxide, titanium oxide, chromium oxide, lead oxide, gypsum, barytes, metal organic frameworks or combinations thereof. In some embodiments, the particles are or comprise silica. In some embodiments, the particles are or comprise polymer. For example, in some embodiments, the particles are or comprise polystyrene or methacrylate-based polymers, which should be highly crosslinked so that they do not swell in oil or water. In some embodiments, the particles can be organic and include a thermoset resin, such as a phenolic resin (e.g., novolac or resole), a furan resin, an epoxy resin, a polyurethane, a polyurea, or a melamine.

In some embodiments, the particles have a mean diameter in a range of about 1 nm to about 1000 nm. In some embodiments, the particles have a mean diameter in a range of about 100 nm to about 500 nm. In some embodiments, the particles have a mean diameter in a range of about 100 nm to about 400 nm. In some embodiments, the size distribution is obtained from dynamic light scattering (DLS), transmission electron microscopy (TEM), and etc. In some embodiments, particles are polydispersed (not monodispersed). In some embodiments, a particular size distribution of nanoparticles is selected based on the pore size of the rock formation.

In some embodiments, the surface of particles is functionalized with a chemical moiety (L), so that the surface free energy of the particles after the functionalization is less than about 50 mJ/m2, about 45 mJ/m2, about 40 mJ/m2, about 35 mJ/m2, about 30 mJ/m2, about 25 mJ/m2, about 20 mJ/m2, about 15 mJ/m2, or about 10 mJ/m2. In some embodiments, particles functionalized with the chemical moiety (L) have a surface free energy lower than an untreated rock formation. In some embodiments, such particles are fluorinated.

Without wishing to be bound by any particular theory, the surface free energy may be related to the wettability of the surface. In some embodiments, the surface free energy of a solid substance may be the surface tension of the highest surface tension liquid that will completely wet the solid, with a contact angle of 0° (known as the Zisman theory). For example, when contact angle data is plotted in the form of liquid surface tension versus cosine of contact angle (cos θ) and extrapolated to cos θ=1 (θ=0°), a surface tension value is obtained for the highest surface tension liquid that will completely wet the sample solid, with a contact angle of 0°.

In some embodiments, the surface energy of a solid may comprise two components, for example, a dispersive component and a polar component (as known as Owens/Wendt Theory). The dispersive component may account for Van der Waals and other non-site specific interactions that a surface is capable of having with applied liquids. The polar component may account for dipole-dipole, dipole-induced dipole, hydrogen bonding, and other site-specific interactions which a surface is capable of having with applied liquids.

$$\gamma_S = \gamma_S^D + \gamma_S^P \qquad (1)$$

$$\gamma_L = \gamma_L^D + \gamma_L^P \qquad (2)$$

where γS is the surface free energy of a solid, γSD is the dispersive component of the surface free energy of the solid, γSP is the polar component of the surface free energy of the solid, γL is the surface free energy of a liquid, γSD is the dispersive component of the surface free energy of the liquid, and γSP is the polar component of the surface free energy of the liquid. The contact angle θ of the liquid on the solid is related to the dispersive component γLD and the polar component γLP of the liquid, as shown in equation 3.

$$\gamma_L(\cos\theta+1) = 2(\gamma_S^D \gamma_L^D)^{1/2} + 2(\gamma_S^P \gamma_L^P)^{1/2} \qquad (3)$$

Then, in some embodiments, the surface free energy of the solid surface may be calculated with the contact angle of two or more different liquids. For example, $$\gamma_{L1}(\cos\theta+1) = 2(\gamma_S^D \gamma_{L1}^D)^{1/2} + 2(\gamma_S^P \gamma_{L1}^P)^{1/2} \qquad (4)$$

$$\gamma_{L2}(\cos\theta+1) = 2(\gamma_S^D \gamma_{L2}^D)^{1/2} + 2(\gamma_S^P \gamma_{L2}^P)^{1/2} \qquad (5)$$

In some embodiments, the surface of the particles is functionalized with a chemical moiety (R) that can react with other chemical moieties (R') on the surface of the rock formation. The R-R' pair may form covalent bonds or electrostatic bonds and Van der Waals interaction.

In some embodiments, particles are functionalized with both of the chemical moiety L (e.g., a moiety with low surface energy groups i.e., fluoroalkyl, perfluoroalkyl, fluoro, silane, linear or branched alkyl, alkylaryl groups) and the chemical moiety R (which contains the functional group that is capable of forming covalent or electrostatic bond with groups on treated or untreated formation surface) as shown in FIG. 1. In some embodiments, on the surface of the particles, the ratio of L to R is 100:1, 50:1, 25:1, 10:1, 5:1 or 1:1. In some embodiments, the chemical moiety L and the chemical moiety R are randomly distributed, patterned on the surface of the nanoparticles In some embodiments, particles are provided to a rock formation in a suspension. In some embodiments, particles are present in a suspension in an amount that ranges from 0.01 to 10 weight percent. In some embodiments, particles are present in a suspension in an amount that ranges from 0.01 to 5 weight percent. In some embodiments, particles are present in a suspension in an amount that ranges from 0.01 to 1 weight percent. In some embodiments, particles are present in a suspension in an amount that ranges from 0.01 to 0.5 weight percent. In some embodiments, particles are present in a suspension in an amount that ranges from 0.05 to 0.5 weight percent.

In some embodiments, a particle suspension comprises a solvent selected from the group consisting of water, brine, methanol, ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof.

The method of treating a subterranean formation may involve single or multiple stages separated into pre-treatment, main and post treatment stages. The pre-treatment stage may involve injection of a pre-flush of water or brine, one or more alcohols, one or more of other solvents, one or more clay stabilizers, one or more water-solvent mixtures, or mixtures of such fluids. In the main stage, the nanoparticles wettability modifiers may be dispersed or mixed in a carrier fluid that may be a solvent or water and may be injected into the well. The formation may be soaked in the fluid that contains a wettability modifier for a period of time (shut-in period). The soaking time can range any way from 1 hour up to 36 hours, preferably 1-0 to 15 hours. In a typical post treatment stage the fluid injected in the main stage is displaced immediately after the main stage, or after a shut-in period, using a gas such as nitrogen or carbon dioxide or any of the fluids used in the pre-treatment stage, or fluids similar to those fluids. In this specification, we may occasionally use the term "solvent" or "carrier fluid" for any of the pretreatment main or post treatment fluids. When the well is put into production, or back on production, or used as an injector, the solvent and the left-over of the nanoparticle chemical treatment flow out of the formation or deeper into the formation, leaving an omniphobic surface with relative roughness in the formation. This alters the wettability of the formation that is initially water or oil wet to an intermediate or gas wetting condition that reduces the capillary pressure of the formation. During the production life cycle of the well, although it generally will not occur, if any water or condensate accumulates in this wettability altered zone, they may easily be cleaned up, thus preventing the formation of water or condensate blocks and enhancing production.

The pre-flush treatment to prepare the rock surface to receive the nanoparticles may contain a rock surface modifier that comprises the second chemical moiety (R') dispersed in a solvent selected from the group consisting of water, brine, methanol, ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof. The pre-flush may contain a rock surface modifier that comprises the second chemical moiety (R') suspended in fresh or deionized water, 2 wt % KCl, 6 wt % KCl, an alcohol and a solvent from the above group or a combination of thereof.

The pre-flush can be a one stage where rock surface modifier (R') is dispersed in solvent or alcohol or a mixture of both. The pre-flush can be a two stage where in the first stage the rock surface modifier (R') is dispersed in mixture of solvent and aqueous solutions in the ratio of 95/5, 90/10, 85/15, 80/20, 75/25, 70/30, 65/35, and 60/40 to disperse the R' followed by a second stage where the surface modifier (R') is dispersed in pure solvent. The pre-flush can be a two stage where in the first stage a mixture of solvent and aqueous solutions in the ratio of 95/5, 90/10, 85/15, 80/20, 75/25, 70/30, 65/35, and 60/40 is pumped, followed by a second stage where the surface modifier (R') is dispersed in pure solvent.

The pre-flush where the aqueous solution includes a chelating agent selected from the group consisting of EDTA, MGDA, GLDA, and HEDTA, or combinations thereof, and the metal chelating agent has a concentration of about 0.1 wt. % to about 40 wt. %.

The main treatment may contain nano-particles in the concentration range of from about 0.001% to about 1.0% by weight, preferably at a concentration of from about 0.01% to about 0.35% by weight. (Note that these concentrations are expressed here as weight of the active nanoparticle ingredients)

The compositions and methods may be used as stand-alone treatments intended to prevent or remediate water blocks and/or condensate banking, or the composition can be used in other treatment fluids. Thus, in addition to stand-alone treatments, the compositions of the Invention may be added to a number of main treatment fluids with beneficial results. Examples are drilling fluids, completion fluids, stimulation fluids, for example matrix treatment fluids, fracture fluids and gravel packing fluids. When used in drilling and completion fluids, the compositions prevent the formation of water blocks. When used as additives in stimulation fluids in production wells, the compositions speed up and increase the extent of clean up and increase oil and gas production after the treatment. When used as additives in stimulation fluids in water injection wells, the compositions of the Invention increase injectivity. Alternatively, treatments may be done as a pre-treatment before stimulation, or as a post treatment after drilling, completion, and stimulation. In another use, fluids containing the wettability modifiers may be selectively introduced into certain layers of a multilayer formation (for example by isolating them with packers), to alter the wettability of those layers, and thereby alter either the relative productivity or injectivity of those layers, or the relative permeability to oil/gas or water of those layers.

This prevention method may be applied to newly drilled oil or gas wells before putting them in production or to producing wells to prevent formation of water or condensate blocks. In cases in which the well is already affected by water or condensate blocks, use of this method enhances clean-up (flow back of water and oil that enter the formation during the operation or by cross flow) and may be used for remediation. The chemical system may be mixed with fluids used in fracturing, acidizing, drilling or other well intervention operations to unload the water or oil that may invade the formation during these operations. The wettability modifier, along with the carrier fluid, may also be pumped as a preflush or post flush before pumping a treatment such as hydraulic fracturing, acid fracturing, matrix stimulation, drilling, gravel packing, frac packing, stim packing, water packing, water fracing, lost circulation control, diversion, sand control, scale dissolution, scale removal, scale control, water control, mud damage removal, completion, mud cake cleaning, or other. The low pressure drop experienced by flowing liquids in such wettability-altered formations (altered from oil or water-wet to intermediate or gas-wet) may also be used to decrease the near wellbore pressure drop, thus enhancing both the production of oil in producing wells and the injectivity of water in injector wells. The wettability modifier adheres to the formation and creates an intermediate or gas-wetting surface that enhances the flow back of water and oil that enter the formation during the operation.

The present invention provides a method of treating a hydrocarbon-bearing formation having at least one fracture, wherein the fracture has brine and a plurality of proppants and where the nanoparticles will attach to the proppant surface and change its wettability.

In another embodiment of the method, a producing oil well or water injection well may be treated with the carrier fluid containing a wettability modifier to alter the wettability of the formation to intermediate or gas wetting. The altered wettability increases the liquid permeability of the medium, thereby enhancing production from oil wells and injectivity of injection wells.

One-Step Methods

In some embodiments, methods provided by the present application comprise contacting a rock formation in the vicinity of a wellbore for a gas condensate reservoir with a particle suspension. In some embodiments, the particles in the particle suspension are functionalized with a first chemical moiety (R). In some embodiments, the rock formation comprises a second chemical moiety (R') on its surface. In some embodiments, the first chemical moiety (R) reacts with the second chemical moiety (R') to form a covalent or electrostatic bond. In some embodiments, one-step methods described in this section may not involve functionalization of the rock formation prior to the contacting of the particle suspension. For example, the untreated rock formation comprises the second chemical moiety (R'), which can form a covalent or electrostatic bond with the first chemical moiety (R) of the particles.

In some embodiments, methods provided by the present application further comprise functionalizing the particles with the first chemical moiety (R) (see, for example, FIG. 1). In some embodiments, the first chemical moiety (R) reacts with the second chemical moiety (R') to form a covalent bond. In some embodiments, the first chemical moiety (R) is selected from the group consisting of a silyl ether group (mono, di and trialkoxysilane, polytrialkoxysilane), an amine group (primary, secondary, tertiary), an aromatic amine, an ammonium group, a quaternary amine group, a polyamine, a silanol, an isocynate, an epoxide, a hydroxyl, a phenol, a halogen (bromo, chloro, iodo), halosilanes (e.g., trichlorosilane, tribromosilane), a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, an acrylamide group, or an allyl group.

Figure 2:
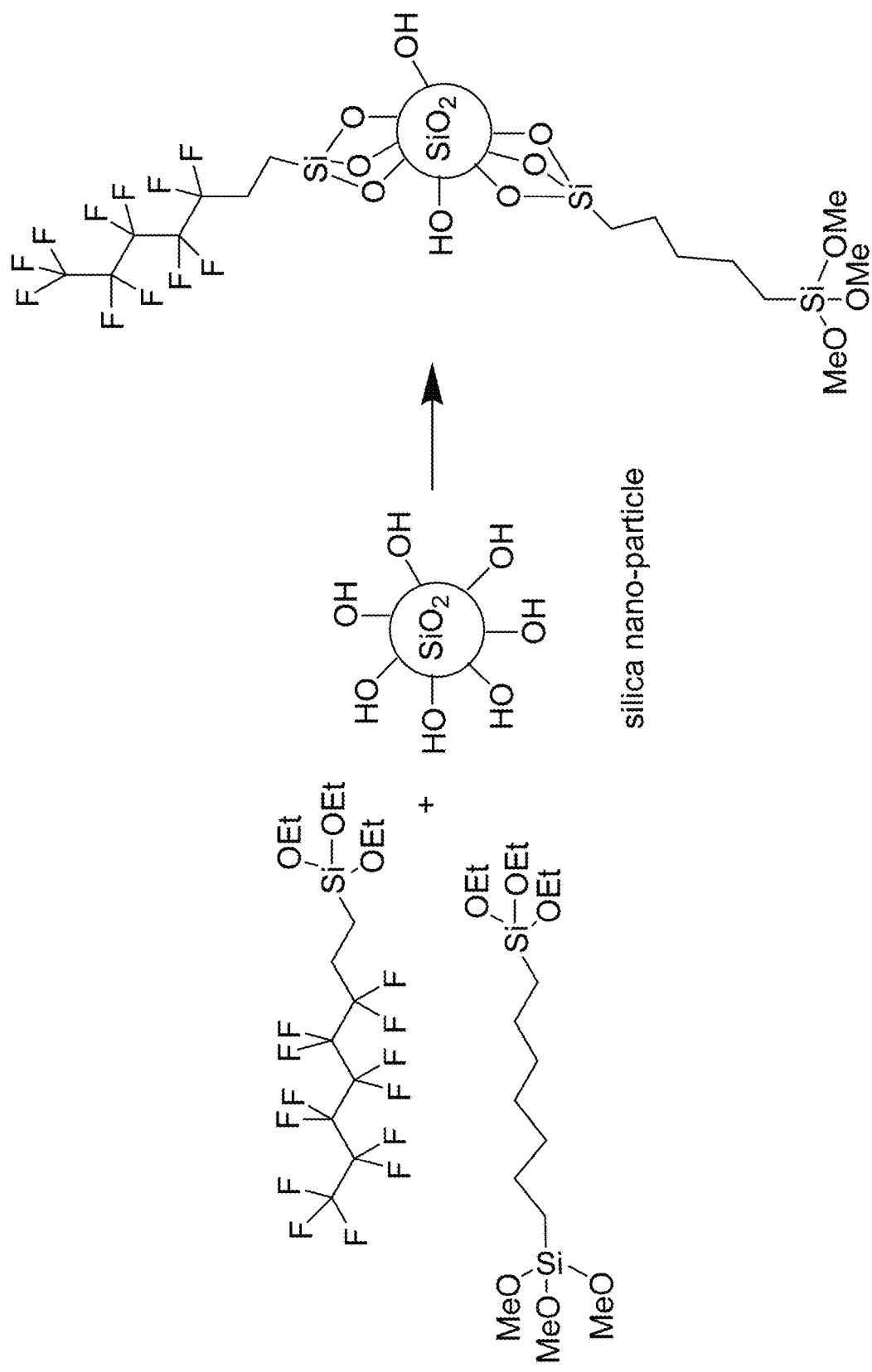
FIG. 2 illustrates an exemplary surface modification process of a bare nanoparticle. The silica nanoparticle with hydroxyl groups is functionalized with 1H,1H,2H,2H-perfluorooctyltriethoxysilane and 1,8-bis(triethoxysilyl)octane for a one-step modification.

In some embodiments, particles are functionalized with 3-(2-aminoethyl)-aminopropyltrimethoxysilane, aminopropyltriethoxysilane, trimethoxysilylpropyl modified (polyethylenimine), dimethoxysilylpropyl modified (polyethylenimine), triethoxysilylbutyraldehyde (an aldehyde functional silane), 4-aminobutyltriethoxysilane, N-(2-aminoethyl)-3-aminopropyltrimethoxysilane, p-aminophenyltrimethoxysilane, N-(2-aminoethyl)-11-aminoundecyltrimethoxysilane (an aliphatic and aromatic amino functional silane), 2-(4-pyridylethyl)triethoxysilane (an pyridine functional silane), N-(2-aminoethyl)-3-aminopropylsilanetriol (an amino functionalized silanol), N,N-dimethyl-3-aminopropylmethyldimethyoxysilane (an secondary amine functionalized silane), octadecyldimethyl(3-trimethoxysilylpropyl)ammonium chloride (an quaternary amine functionalized silane), bis(3-triethoxysilylpropyl)amine (a dipodal amine functionalized silane), aminoethylaminopropylsilsesquioxane, 3-triethoxysilyl)propylsuccinic anhydride (an anhydride functional silane), carboxyethylsilanetriol disodium, N-(trimethoxysilylpropyl)ethylenediaminetriacetate, tripotassium salt (an carboxylic acid functionalized silane), 2-(4-chlorosulfonylphenyl)ethyltrimethoxysilane (a sulfonate functionalized silane), 3-(glycidoxypropyl)trimethoxysilane (an epoxy functionalized silane), 4-bromobutyltrimethoxysilane (a halogen functionalized silane), N-(hydroxyethyl)-N-methylaminopropyltrimethoxysilane (an hydroxyl functional silane), 3-isocynatopropyltriethoxysilane (an isocynate functional silane), 3-(trihydroxysilyl)propyl methylphosphonate monosodium salt (a phosphonate functionized silane), 3-mercaptopropyltrimethoxysilane (a mercapto functionalized silane), 3-thiocyanatopropyltriethoxysilane (a thiocynate functionalized silane), bis(3-(triethoxysilyl)propyl)disulfide (a disulfide functionalized silane), 1,2-bis (triethoxysilyl)ethane hexaethoxydisilethylene (a di-functional silane), γ-(methacryloxy)propyltrimethoxysilane, 3-acrylamidopropyltrimethoxysilane, 2-(chloromethyl)allyltrimethoxysilane, allyltrimethoxysilane. An exemplary functionalization of the particles for the one-step method is illustrated in FIG. 2.

In some embodiments, the first chemical moiety (R) reacts with the second chemical moiety (R') to form an electrostatic bond. In some embodiments, the first chemical moiety (R) is selected from the group consisting of a carboxyl group, polycarboxylic groups, amine groups, quaternary ammonium groups, polyamine group, pyridine group, phosphonium group, phosphate groups, phosphonate groups, sulfonate groups, sulfonic acid groups, sulfate groups, zwitterionic groups. In some embodiments, particles are functionalized with, for example, N-(trimethoxysilylpropyl)ethylenediaminetriacetate, trisodium salt, carboxyethylsilanetriol, triethoxysilylpropylmaleimic acid, N-(trimethoxysilylpropyl)ethylenediaminetriacetate, tripotassium salt, polyacrylic acid, polyaspartate, 3-(2-aminoethyl)-aminopropyltrimethoxysilane, aminopropyltriethoxysilane, trimethoxysilylpropyl modified (polyethylenimine), dimethoxysilylpropyl modified (polyethylenimine), 4-aminobutyltriethoxysilane, N-(2-aminoethyl)-3-aminopropyltrimethoxysilane, p-aminophenyltrimethoxysilane, N-(2-aminoethyl)-11-aminoundecyltrimethoxysilane (an aliphatic and aromatic amino functional silane), 2-(4-pyridylethyl)triethoxysilane (an pyridine functional silane), N-(2-aminoethyl)-3-aminopropylsilanetriol (an amino functionalized silanol), N,N-dimethyl-3-aminopropylmethyldimethyoxysilane (an secondary amine functionalized silane), octadecyldimethyl(3-trimethoxysilylpropyl)ammonium chloride (an quaternary amine functionalized silane), bis(3-triethoxysilylpropyl)amine (a dipodal amine functionalized silane), aminoethylaminopropylsilsesquioxane, 3-triethoxysilyl)propylsuccinic anhydride (an anhydride functional silane), carboxyethylsilanetriol disodium, N-(trimethoxysilylpropyl)ethylenediaminetriacetate, tripotassium salt (an carboxylic acid functionalized silane), 2-(4-chlorosulfonylphenyl)ethyltrimethoxysilane (a sulfonate functionalized silane), 3-(trihydroxysilyl)propyl methylphosphonate monosodium salt (a phosphonate functionized silane)

Figure 8:
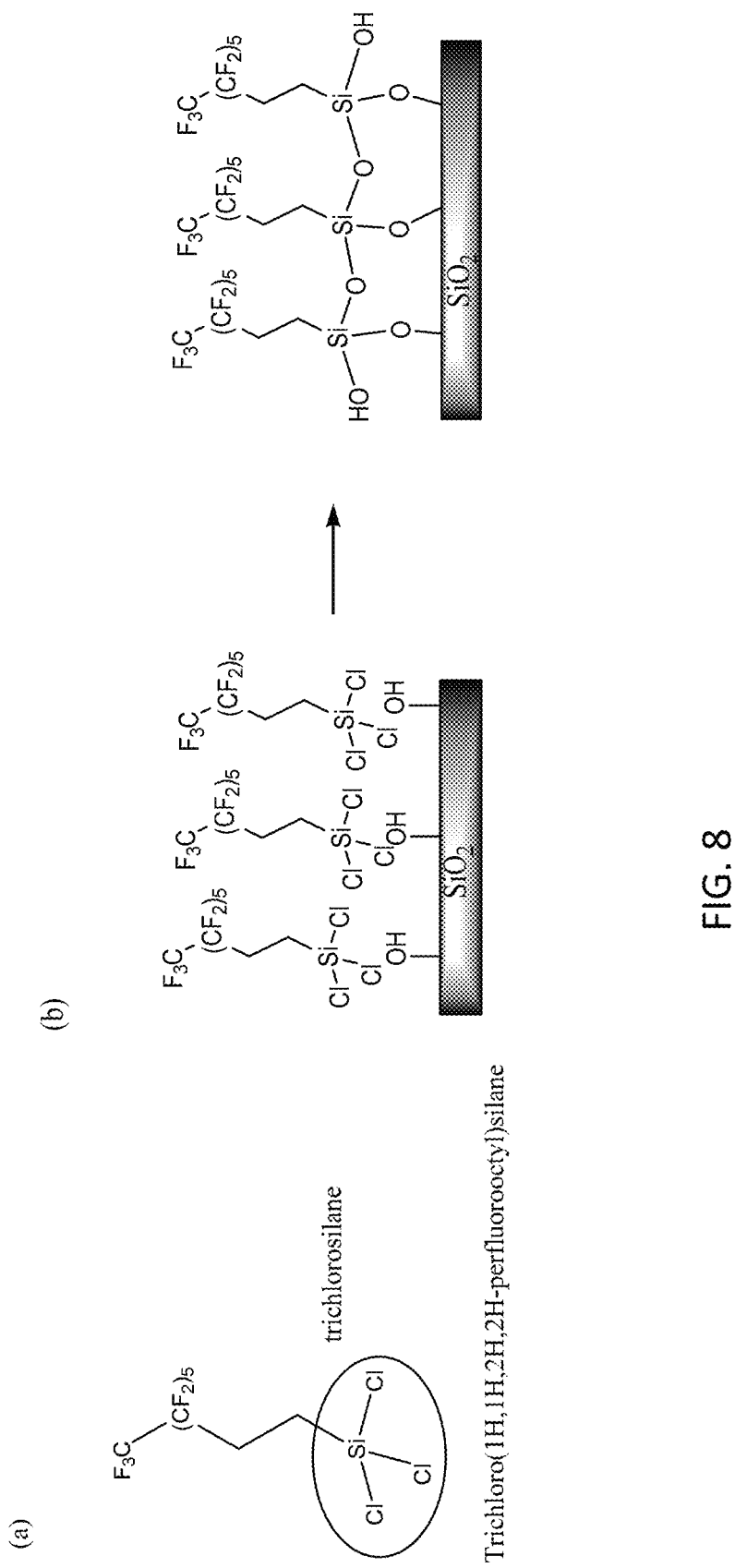
FIG. 8 illustrates the reaction of a halosilane with a hydroxyl group on the silica nanoparticles.

In some embodiments, the methods further comprise functionalizing the particles with a chemical moiety (L), so that the particles have a surface free energy lower than the untreated rock formation. In some embodiments, the methods further comprise functionalizing the particles with a chemical moiety (L), so that the surface free energy of the particles is less than about 50 mJ/m2, about 45 mJ/m2, about 40 mJ/m2, about 35 mJ/m2, about 30 mJ/m2, about 25 mJ/m2, about 20 mJ/m2, about 15 mJ/m2, or about 10 mJ/m2. In some embodiments, particles functionalized with the chemical moiety (L) have a surface free energy lower than an untreated rock formation. In some embodiments, such particles are fluorinated. The chemical moiety L includes hydrophobic moiety, oleophobic moiety or omniphobic moiety. The L moiety contains at least one of group containing a linear or branched alkyl containing group, an alkylaryl containing group, an aromatic containing group, a fluoroalkyl containing group, a perfluoroalkyl containing group, an organic silicon containing group or combinations thereof. The hydrocarbon or alkyl chain length may include more than 5, 7, 9, 10, 12, 14, 15, 20 or 22 carbons. The hydrophobic moiety, oleophobic moiety, or omniphobic moiety of the functionalized nanoparticles may originate from alkoxysilane or a halosilane containing hydrophobic and/or omniphobic group. A halosilane is any halogen-substituted silane with at least one of alkyl-containing, fluoroalkyl-perfluoroalkyl-, organosilane or aromatic-containing groups. The halosilane may comprise at least one of fluorine, chlorine, bromine and iodine, group attached to silane group. One non-limiting example of a halosilane with a fluoroalkyl group is trichloro(1H, 1H, 2H, 2H-perfluorooctyl)silane. This reaction is illustrated in FIG. 8. Although FIG. 8 depicts trichlorosilanes, other halogens may be used in place of the chlorine, such as bromine.

The fluorosilane solution may include at least one of perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H,1H,2H,2H-perfloorodecyltriethoxysilane and perfluorodecyltrichlorosilane.

In some embodiments, the second chemical moiety (R') is a hydroxyl group, a metallic oxide group, metallic carbonate groups, silicate groups on the rock formation to be treated. In some cases R' includes metallic or transition metallic minerals and salts of aluminum, barium, calcium, cobalt, copper, iron, lead, lithium, magnesium, nickel, silver, zinc, zirconium, calcium, tin, titanium, chromium, lead, barium, scandium, vanadium, gallium, germanium, with which some of the R group may form an electrostatic bond. For example, the ammonium group, the amine group, the amide group, or the pyridinium group, can form an electrostatic bond with a silica or silicate surface (e.g., clays, sand etc.). The phosphate or phosphonate group, the carboxylic group, the sulfate group, or the sulfonate group can form electrostatic bond with carbonate, dolomite and alumina surface or formation.

Figure 3:
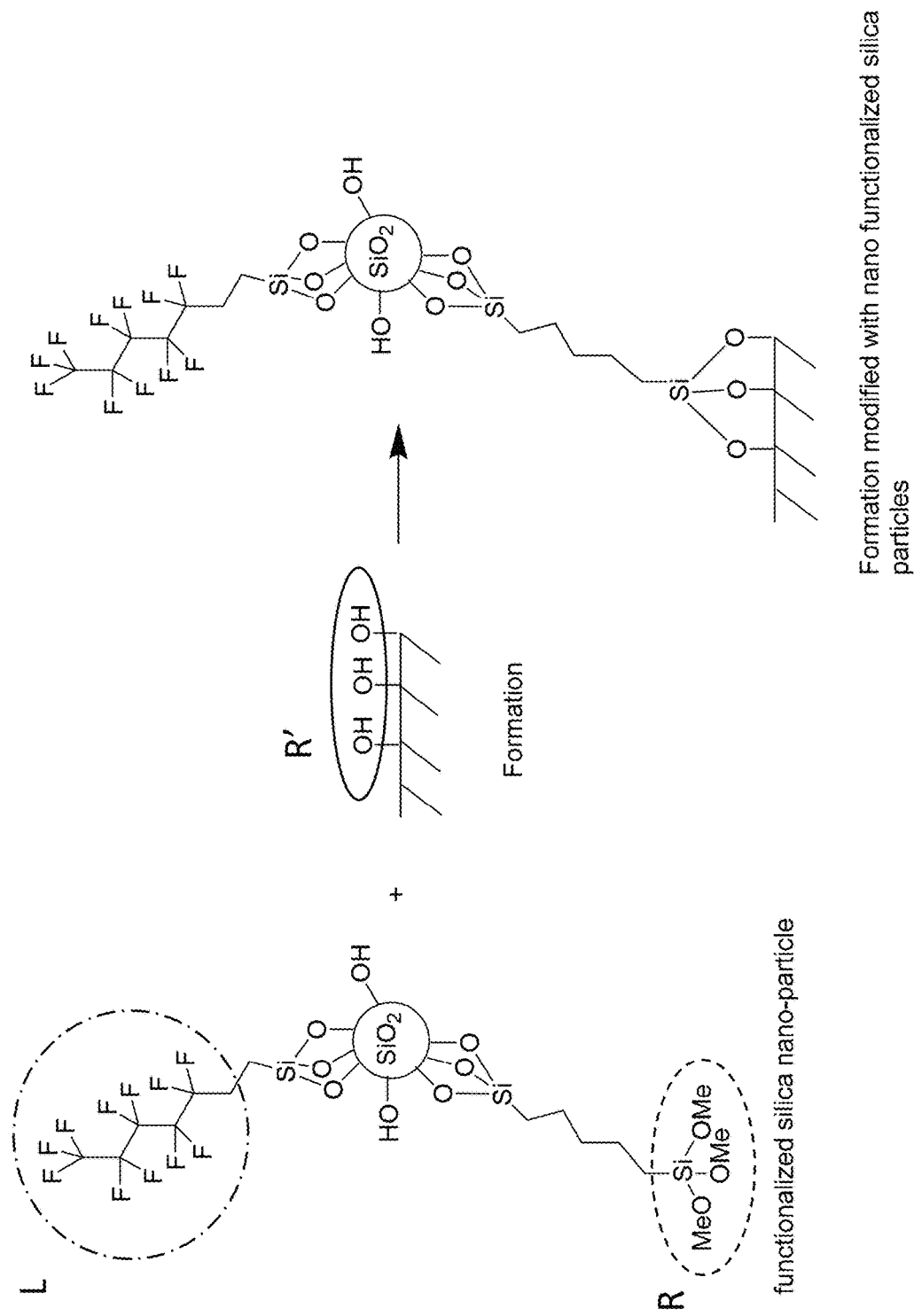
FIG. 3 depicts an exemplary one-step modification. A silyl ether group on the silica nanoparticle and a hydroxyl group on the sandstone form a covalent bond.
Figure 7:
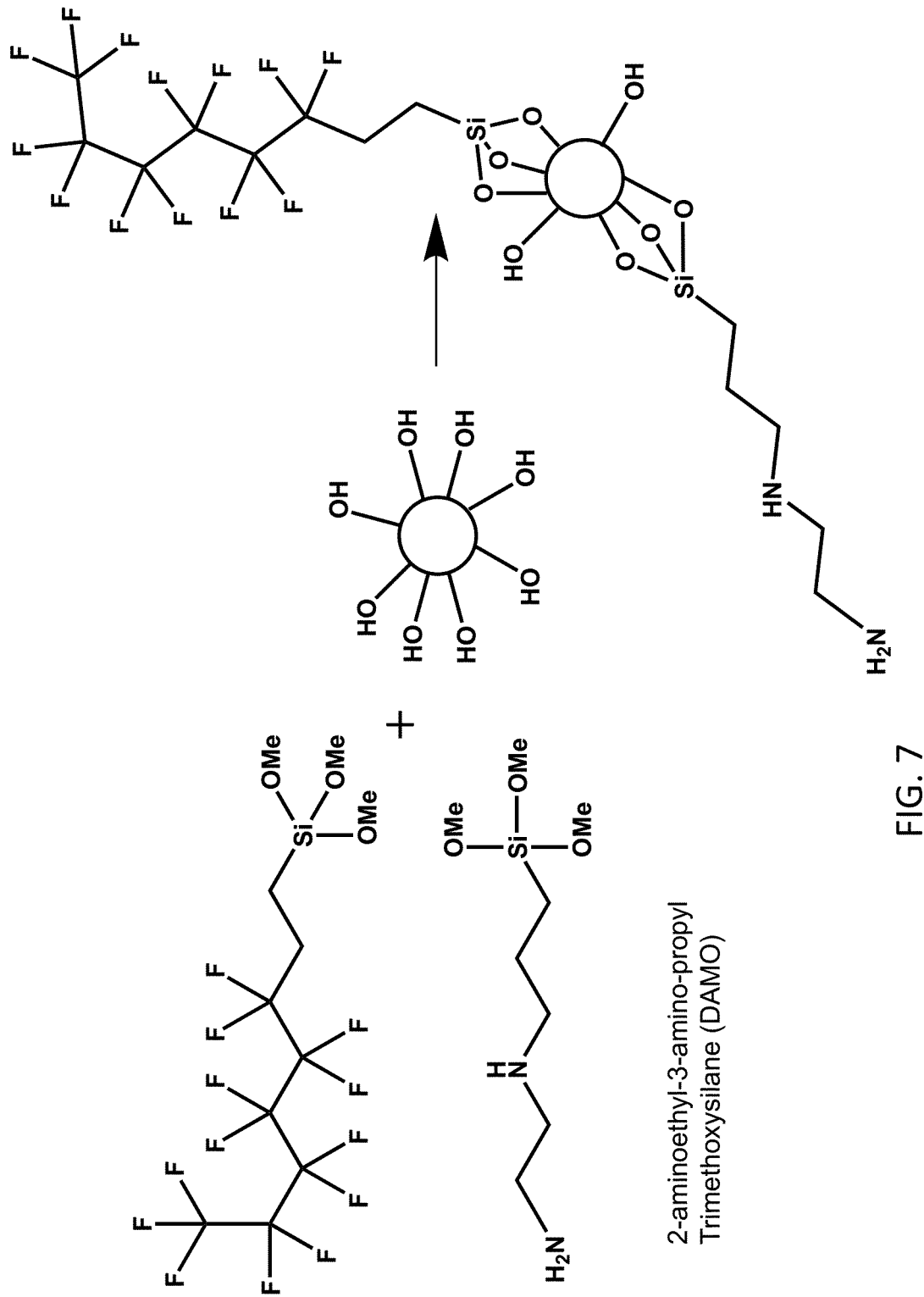
FIG. 7 illustrates another exemplary surface modification process of a bare nanoparticle. The silica nanoparticle is functionalized with 1H,1H,2H,2H-perfluorooctyltriethoxysilane and 2-aminoethyl-3-amino-propyl trimethoxysilane for a one-step modification. The positively charged diamino functional group on the silica nanoparticles will associate ionically with the negatively charged sandstone surface and form an electrostatic bond.

FIG. 3 describes an exemplary one-step method. The particle functionalized with the first chemical moiety (R) and the chemical moiety (L) forms a covalent bond with the hydroxyl group (R') on the rock formation. In this example, the silyl ether group of the particle reacts with the hydroxyl group. The fluorine containing group of the particle having a lower surface free energy than an untreated rock formation may provide reduced wettability of the rock formation to water or oil. Another exemplary functionalization of the particles for the one-step method is illustrated in FIG. 7. The particle functionalized with the first chemical moiety (L) and the chemical moiety (R), where R forms an electrostatic bond with the rock formation.

Two-Step Methods

Figure 5:
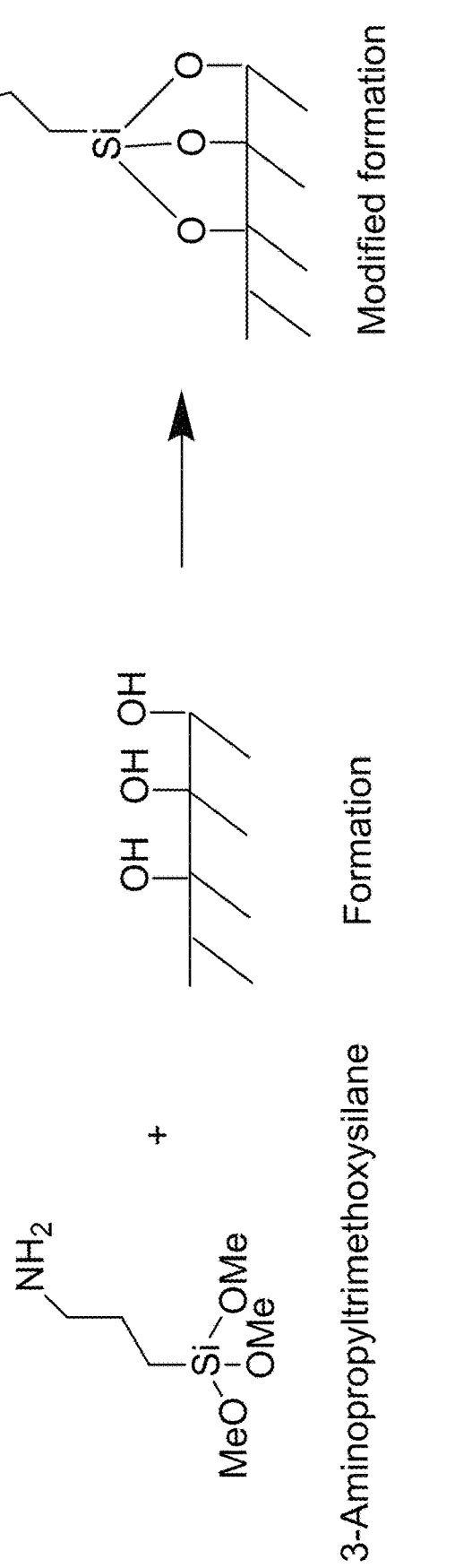
FIG. 5 illustrates an exemplary surface modification process of a sandstone surface. The sandstone is functionalized with 3-aminopropyltrimethoxysilane for subsequent reaction with functionalized nanoparticle in a two-step modification.

In some embodiments, methods provided by the present application comprise contacting a rock formation in the vicinity of a wellbore for a gas condensate reservoir with a particle suspension. In some embodiments, the particles in the particle suspension are functionalized with a first chemical moiety containing (R) group. In some embodiments, the rock formation comprises a second chemical moiety (R') on its surface. In some embodiments, the first chemical moiety (R) reacts with the second chemical moiety (R') to form a covalent or electrostatic bond. In some embodiments, two-step methods described in this section involve functionalization of the rock formation prior to the contacting of the particle suspension. For example, the rock formation obtains the second chemical moiety (R') from the functionalization process as shown in FIG. 5. In some embodiments, the second chemical moiety (R') is the same as the existing surface chemistry of the untreated rock formation (for example, a hydroxyl group). In some embodiments, the second chemical moiety (R') is different from the existing surface chemistry of the untreated rock formation.

In some embodiments, methods provided by the present application further include functionalizing the particles with the first chemical moiety (R). In some embodiments, the first chemical moiety (R) reacts with the second chemical moiety (R') to form a covalent bond. In some embodiments, the first chemical moiety (R) is selected from the group consisting of an epoxide group, a silyl ether group (mono, di and trialkoxysilane, polytrialkoxysilane), an amine group (primary, secondary, tertiary), an aromatic amine, an ammonium group, a quaternary amine group, a polyamine, a silanol, an isocynate, an epoxide, a hydroxyl, a phenol, a halogen (bromo, chloro, iodo), halosilanes (e.g., trichlorosilane, tribromosilane), a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, acrylamide group, or an allyl group.

In some embodiments, the second chemical moiety (R') is selected from a hydroxyl group, a polyamine, a quaternary amine group, an epoxide, an isocynate, a silyl ether group (mono, di and trialkoxysilane, polytrialkoxysilane), an amine group (primary, secondary, tertiary), an aromatic amine, an ammonium group, a quaternary amine group, a silanol, an isocynate, a phenol, a halogen (bromo, chloro, iodo), halosilanes (e.g., trichlorosilane, tribromosilane), a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, an acrylamide group, or an allyl group.

In some embodiments, the first chemical moiety (R) is an epoxide group and the second chemical moiety (R') is an amine group. In some embodiments, particles are functionalized with and 3-glycidoxypropyltriethoxysilane. In some embodiments, the rock formation is functionalized with 3-aminopropyltrimethoxysilane, N-(2-aminoethyl)-3-aminopropyltrimethoxysilane, 3-(2-aminoethyl)-aminopropyltrimethoxysilane, aminopropyltriethoxysilane, trimethoxysilylpropyl modified (polyethylenimine), dimethoxysilylpropyl modified (polyethylenimine), triethoxysilylbutyraldehyde, 4-aminobutyltriethoxysilane, N-(2-aminoethyl)-3-aminopropyltrimethoxysilane, p-aminophenyltrimethoxysilane, N-(2-aminoethyl)-11-aminoundecyltrimethoxysilane, 2-(4-pyridylethyl)triethoxysilane, N-(2-aminoethyl)-3-aminopropylsilanetriol, N,N-dimethyl-3-aminopropylmethyldimethyoxysilane, octadecyldimethyl(3-trimethoxysilylpropyl)ammonium chloride, bis(3-triethoxysilylpropyl)amine, aminoethylaminopropylsilsesquioxane, 3-triethoxysilyl propyl succinic anhydride, carboxyethylsilanetriol disodium, N-(trimethoxysilylpropyl)ethylenediaminetriacetate, tripotassium salt, 2-(4-chlorosulfonylphenyl)ethyltrimethoxysilane, 3-(glycidoxypropyl)trimethoxysilane, 4-bromobutyltrimethoxysilane, N-(hydroxyethyl)-N-methylaminopropyltrimethoxysilane, 3-isocynatopropyltriethoxysilane, 3-(trihydroxysilyl)propyl methylphosphonate monosodium salt, 3-mercaptopropyltrimethoxysilane, 3-thiocyanatopropyltriethoxysilane, bis(3-(triethoxysilyl)propyl)disulfide, 1,2-bis(triethoxysilyl)ethane hexaethoxydisilethylene, □-(methacryloxy)propyltrimethoxysilane, 3-acrylamidopropyltrimethoxysilane, 2-(chloromethyl)allyltrimethoxysilane, or an allyltrimethoxysilane.

In some embodiments, the first chemical moiety (R) reacts with the second chemical moiety (R') to form an electrostatic bond. In some embodiments, the first chemical moiety (R) is selected from the group consisting of an amine, an ammonium, a sulfate, a sulfonate, a phosphate, a phosphonate, a carboxylic acid, a carboxylate, or a succinate. In some embodiments, the second chemical moiety (R') is selected from an amine, an ammonium, a sulfate, a sulfonate, a phosphate, a phosphonate, a carboxylic acid, a carboxylate, or a succinate. In some embodiments, particles are functionalized with 3-(2-aminoethyl)-aminopropyltrimethoxysilane, aminopropyltriethoxysilane, trimethoxysilylpropyl modified (polyethylenimine), or dimethoxysilylpropyl modified (polyethylenimine). In some embodiments, the rock formation is functionalized with an amine group (primary, secondary, tertiary), an aromatic amine, an ammonium group, a quaternary amine group, a polyamine, a silanol, an isocynate, an epoxide, a hydroxyl, a phenol, a halogen (bromo, chloro, iodo), halosilanes (e.g., trichlorosilane, tribromosilane), a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, an acrylamide group, or an allyl group.

Figure 4:
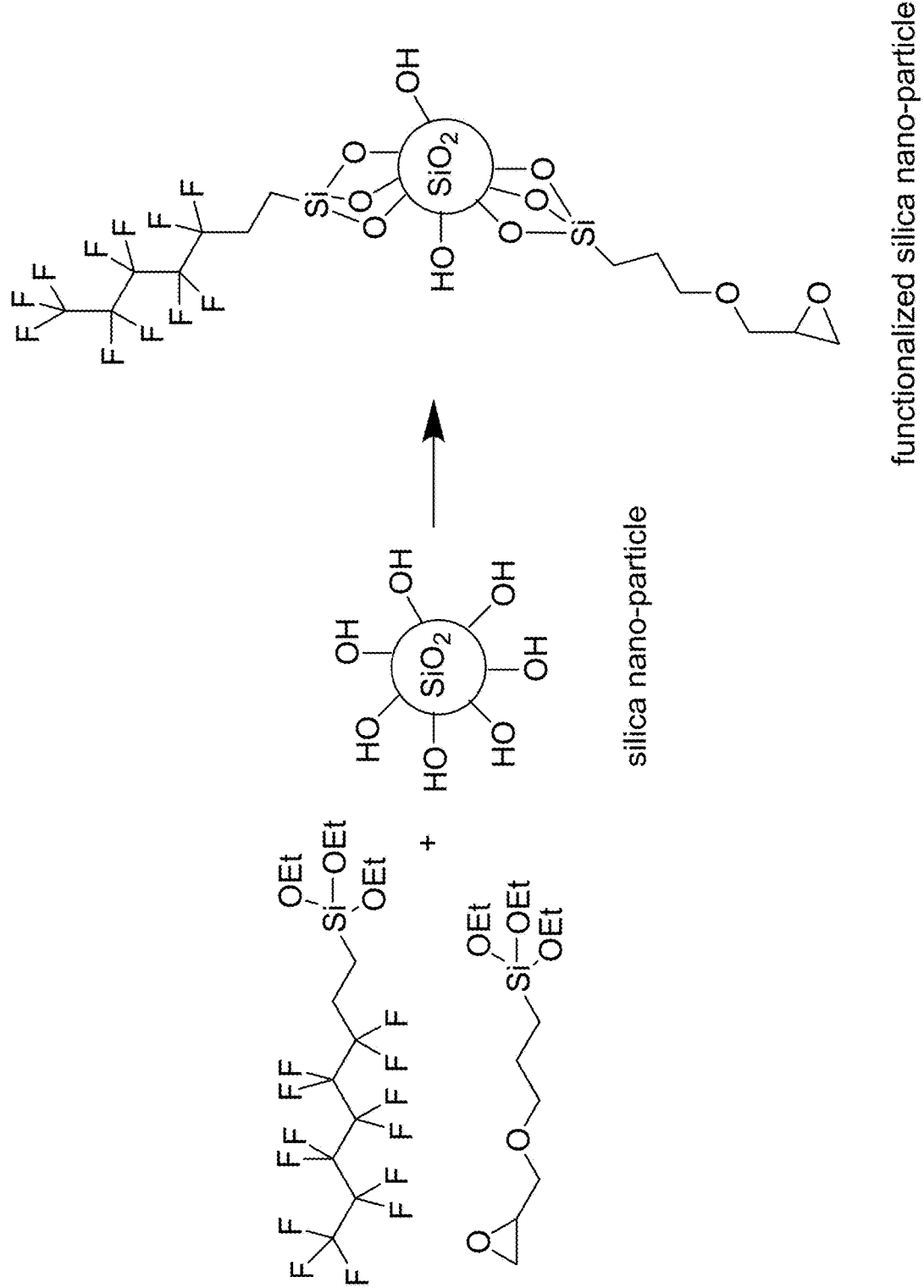
FIG. 4 illustrates an exemplary surface modification process of a bare nanoparticle. The silica nanoparticle with hydroxyl groups is functionalized with 1H,1H,2H,2H-perfluorooctyltriethoxysilane and 3-glycidoxypropyltriethoxysilane for a two-step modification.

In some embodiments, the methods further comprise functionalizing the particles with a chemical moiety (L), so that the particles have a surface free energy lower than the untreated rock formation. In some embodiments, the methods further comprise functionalizing the particles with a chemical moiety (L), so that the surface free energy of the particles is less than about 50 mJ/m2, about 45 mJ/m2, about 40 mJ/m2, about 35 mJ/m2, about 30 mJ/m2, about 25 mJ/m2, about 20 mJ/m2, about 15 mJ/m2, or about 10 mJ/m2. In some embodiments, particles functionalized with the chemical moiety (L) have a surface free energy lower than an untreated rock formation. In some embodiments, such particles are fluorinated. In some embodiments, such particles are functionalized with 1H,1H,2H,2H-perfluorooctyltriethoxysilane or one of the other components disclosed above. Exemplary double or mixed functionalizations of the particles for the one-step method are illustrated in FIGS. 4 and 7. In some cases, where the one-step method is carried out, both a first coating and a second coating include the nanoparticles, where one coating is to attach to the formation and the other to achieve repellency.

Figure 6:
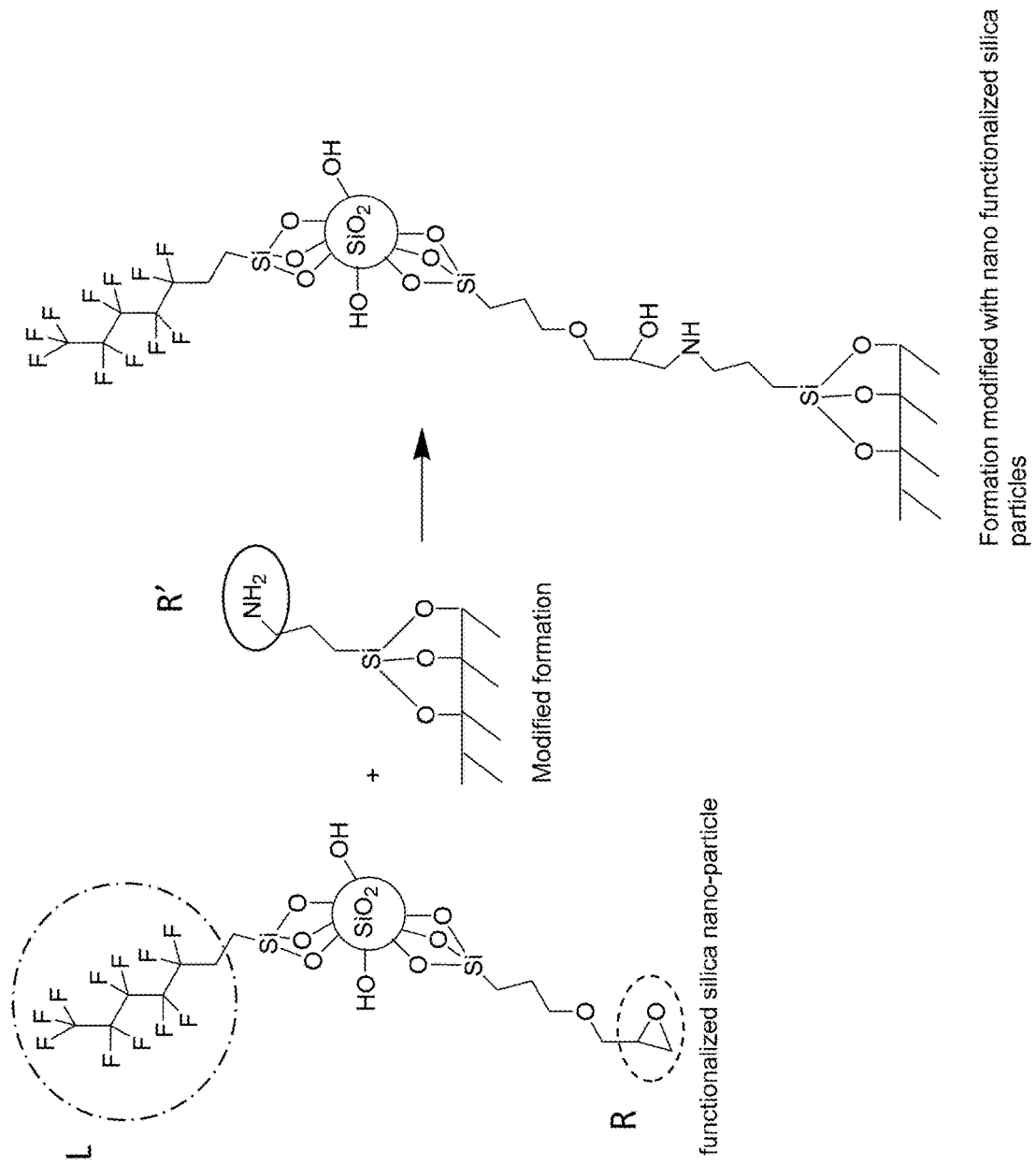
FIG. 6 depicts an exemplary two-step modification. An epoxide group on the silica nanoparticle and an amine group on the sandstone form a covalent bond.

FIG. 6 describes an exemplary one-step method. The particle functionalized with the first chemical moiety (R) and the chemical moiety (L) forms a covalent bond with the rock formation. In this example, the silyl ether group of the particle reacts with the hydroxyl group. The fluorine containing group of the particle having a lower surface free energy than an untreated rock formation may provide reduced wettability of the rock formation to water or oil.

Properties of Modified Rock Formation

In some embodiments, a rock formation that has been modified with a polymer solution and textured with a particle suspension (a "chemically treated rock formation") is characterized by certain properties. In some embodiments, a chemically treated rock formation is omniphobic. In some embodiments, a chemically treated rock formation has greater droplet mobility (both water droplet and oil droplet, for example, a droplet of water and a droplet of decane) relative to a non-treated rock formation. In some embodiments, a surface of a chemically treated rock formation may prefer gas to water or oil energetically, thereby reducing pressure drop, entrapment, or accumulation of liquid phase within the pore space.

In some embodiments, a liquid condensate relative permeability (Kro), a gas relative permeability (Krg), or both are useful to determine the effectiveness of the treatment. A relative permeability (Kr) is the ratio of effective permeability (Ke) of a particular fluid in a multiphase flow to absolute permeability (Ka). The absolute permeability is a property of a porous medium, and represents the capacity of the medium to transmit fluids by measuring the permeability of the medium saturated with a single phase fluid.

In some embodiments, the single phase fluid may be any fluid having one phase (for example, gas or liquid). In some embodiments, the single phase fluid may be nitrogen, water, hydrocarbon, or aqueous 2 weight percent potassium chloride (KCl) solution. In some embodiments, the absolute permeability may be calculated from Darcy's equation, as follows:

$$K_a = \frac{Q_s \mu_s L}{A \Delta P} \tag{6}$$

where Qs is the flow rate of the single phase fluid (cubic centimeter per minute (cm3/min)), µs is the viscosity of the single phase fluid (centipoise (cP)), L is the length of the core sample (cm), A is the cross section of the core sample (square centimeter (cm2)), and ΔP is the pressure drop across the core sample (atmosphere).

In some embodiments, under steady state conditions, the effective permeability of a liquid condensate (Keo) and the effective permeability of a gas (Keg) in a core sample may be calculated from Darcy's equation, as follows:

$$K_{eo} = \frac{Q_o \mu_o L}{A \Delta P} \tag{7}$$

$$K_{eg} = \frac{Q_g \mu_g L}{A \Delta P} \tag{8}$$

where Qo is the flow rate of the liquid condensate (cm3/min), Qg is the flow rate of the gas (cm3/min), µo is the viscosity of the liquid condensate (cP), and µg is the viscosity of the gas (cP). In some embodiments, the ratio of the relative permeability of liquid condensate (or gas) after and before the chemical treatment is used to calculate the relative permeability improvement factor and to determine the success of the treatment.

In some embodiments, a mixture of hydrocarbons may be used for the measurement of the relative permeability of liquid condensate and gas. In some embodiments, the mixture comprises one or more saturated hydrocarbons. In some embodiments, the carbon number of the saturated hydrocarbons ranges from 1 to 40; however, higher numbers are possible depending on the gas composition. In some embodiments, the mixture comprises methane, ethane, propane, butane(s), hexane(s), heptane(s), octane(s), nonane(s), decane(s), undecane(s), dodecane(s), or combinations thereof. In some embodiments, a chemically treated rock formation has greater gas relative permeability (Krg) relative to a non-treated rock formation. In some embodiments, a chemically treated rock formation has an improvement in gas relative permeability by a factor of up to about 5.0, up to about 4.5, up to about 4.0, up to about 3.5, up to about 3.0, up to about 2.5, up to about 2.0, up to about 1.9, up to about 1.8, up to about 1.7, up to about 1.6, up to about 1.5, up to about 1.4, up to about 1.3, up to about 1.2, or up to about 1.1 relative to a non-treated rock formation.

In some embodiments, a chemically treated rock formation has greater liquid condensate relative permeability (Kro) relative to a non-treated rock formation. In some embodiments, a chemically treated rock formation has an improvement in liquid condensate relative permeability by a factor of up to about 5.0, up to about 4.5, up to about 4.0, up to about 3.5, up to about 3.0, up to about 2.5, up to about 2.0, up to about 1.9, up to about 1.8, up to about 1.7, up to about 1.6, up to about 1.5, up to about 1.4, up to about 1.3, up to about 1.2, or up to about 1.1 relative to a non-treated rock formation.

In some embodiments, the contact angle of deionized water on a surface of a chemically treated rock formation is in a range of about 60 to about 160 degrees, about 90 to about 160 degrees, or about 120 to about 160 degrees. In other embodiments, the contact angle of the water is about 90 to about 110 degrees. In various embodiments, the water can be fresh water, deionized water, low salinity water, high salinity water, or an aqueous 2-6 weight % potassium chloride (KCl) solution.

In some embodiments, the contact angle of an aqueous 2 weight % KCl solution on a surface of a chemically treated rock formation is in a range of about 60 to about 160 degrees, about 90 to about 160 degrees, or about 120 to about 160 degrees. In other embodiments, the contact angle of the aqueous solution is about 90 to about 110 degrees In some embodiments, the contact angle of decane on a surface of a chemically treated rock formation is in a range of about 40 to about 160 degrees, about 45 to about 160 degrees, or about 50 to about 160 degrees. In other embodiments, the contact angle of the decane is about 70 to about 90 degrees.

The contact angle of the particles can be tailored by varying the amount of L group on the surface of the nanoparticles with respect to already existing groups on the nanoparticles and the groups attached to the coupling group. In some cases only partial functionalization is necessary to get to the desired contact angle. Full functionalization of the surface of the particles may sometimes lead to either too hydrophobic or too hydrophilic particles that may create problems. For instance, if particles are functionalized with too much of the fluoro groups, they may not be suspended in water for treatment. Ideally, a treated surface has a contact angle of about 90 degree for oil and gas to be produced without any blockage. But in some instances, a larger or smaller contact angle to oil and water may also produce the well optimally. In some cases, the formation of covalent and electrostatic bonds improves the durability of the treatment.

In some embodiments, a chemically treated rock formation exhibits hierarchical roughness. In some embodiments, a chemically treated rock formation has a first characteristic length (for example, an inherent surface roughness or pore size of a rock formation, for example, on a micron scale), and a second characteristic length (for example, a mean diameter of nanoparticles, for example, on a nanometer scale), wherein the first characteristic length and the second characteristic length are substantially different, creating hierarchical roughness.

Systems for Chemical Treatment of a Rock Formation

In some embodiments, a system for mitigating condensate banking in the vicinity of a wellbore for a gas condensate reservoir comprises a first container or source of the particle suspension (for example, comprising particles with a surface free energy lower than an untreated rock formation, which are functionalized with a first chemical moiety (R) that is capable of reacting with a second chemical moiety (R') on the surface of a rock formation to form a covalent or electrostatic bond) and conduits for introducing the particle suspension into the same rock formation in the vicinity of a wellbore for a gas condensate reservoir. In some embodiments, the system further comprises a second container or source that comprises a solution for functionalizing the rock formation with the second chemical moiety (R').

In some embodiments, a system for mitigating condensate banking in the vicinity of a wellbore introduces a particle suspension into the rock formation. In some embodiments, the flow rate is adjusted to provide enough time for particles to form a covalent or electrostatic bond with the rock formation. In some cases, the well can be shut-off for up to about 24 hours for the formation of covalent bonds or better interaction with the formation. In some embodiments, the time may be 15 hours or less.

In some embodiments, a system for mitigating condensate banking in the vicinity of a wellbore introduces a solution for functionalizing the rock formation with the second chemical moiety (R'). In some embodiments, the flow rate is adjusted to provide enough time for particles in the solution to associate the second chemical moiety (R') with a rock formation.

In some embodiments, a system introduces a solution and a particle suspension into a rock formation in the vicinity of a wellbore by introducing them into the wellbore, or by injecting them into areas around the wellbore. In some embodiments, a solution and a particle suspension may flow through a wellbore to a rock formation, for example, through pore spaces in the rock formation itself due to a pressure difference between the wellbore and the rock formation. In some embodiments, a solution and a particle suspension may be injected through a wellbore, and then the solution and the particle suspension may be transported to an area around the wellbore.

In some embodiments, a polymer solution and a particle suspension may be injected via a coiled tubing or bullheading in a production tubing string. In some embodiments, a solution and a particle suspension may be injected in separate stages and using the same or different conduits.

EXAMPLES

In order that the application may be more fully understood, the following examples are set forth. It should be understood that these examples are for illustrative purposes only and are not to be construed as limiting in any manner.

Example 1

Synthesis of Mixed Epoxy and Fluorinated Functionalized Silica Nanoparticles

The present Example describes the modification of a sandstone surface in accordance with certain embodiments of the present application. The exemplary process is to be presented.

Silica Nanoparticles

Various sized (1.0 nm-500 nm diameter) silica nanoparticles were synthesized using the Stober or a modified Stober process. The method involved the addition of tetraethyl orthosilicate (TEOS) or other silicates in a mixture of water, alcohol, and ammonia. The mixture was agitated to form nanoparticles whose size depends on the concentration of the solvents and silicate additives. The nanoparticles formed were centrifuged, washed with water and alcohol four times, and dried in an oven at 150° C. for 5 hours. The size distributions of silica were measured by dynamic light scattering.

Fluorinated Functionalized Silica Nanoparticles

Surface modification of silica nanoparticles is readily achieved by reaction with alkoxysilanes or halosilanes. Alkoxysilanes will bind forming a Si—O—Si link on surface in a condensation reaction with the surface silanol groups. The halosilanes will typically hydrolyze substituting the halide for alcohol group, which can similarly undergo condensation reaction with surface silanol groups.

Fluorinated silica nanoparticles were formed by addition of 100 μL of 1H,1H,2H,2H-perfluorooctyltriethoxysilane, 97% (as available from Alfa Aesar) to 20 milliliter (mL) of the silica nanoparticle solutions in ethanol and stirring it for 8 hours at room temperature. The functionalized nanoparticles were washed twice by centrifugation at 9000 revolutions per minute (RPM) for 20 minutes and re-suspended in ethanol.

Mixed Epoxy and Fluorinated Functionalized Silica Nanoparticles

Mixed epoxy and fluorinated functionalized silica nanoparticles were formed by the addition of 100 microliter (μL) of 1H,1H,2H,2H-perfluorooctyltriethoxysilane, 97% (Alfa Aesar) and 20 μL of r-glycidoxypropyl-trimethoxysilane to 20 mL of the silica nanoparticle solutions in ethanol and stirring it for 8 hours at room temperature. The modified nanoparticles were washed twice by centrifugation at 9000 RPM for 20 minutes and re-suspended in ethanol.

Mixed Diamino and Fluorinated Functionalized Silica Nanoparticles

Mixed diamino and fluorinated functionalized silica nanoparticles were formed by the addition of 100 microliter (μL) of 1H,1H,2H,2H-perfluorooctyltriethoxysilane, 97% and 20 μL of 2-aminoethyl-3-amino-propyltrimethoxysilaneto 20 mL of the silica nanoparticle solutions in ethanol and stirring it for 8 hours at room temperature. The modified nanoparticles were washed twice by centrifugation at 9000 RPM for 20 minutes and re-suspended in ethanol.

Functionalization of SiO2 Nanoparticles 100 mL of as-synthesized silica nanoparticles (1 weight %) was placed in a round bottom flask and stirred until a good vortex was formed (about 500 rpm). One hundred (100) μL of 1H,1H,2H,2H-perfluorooctyltriethoxysilane was rapidly dropped into the silica nanoparticle solution using a micro-pipet and the solution was kept stirring overnight (>12 hours) at room temperature and collected as-synthesized. For binder functional group decoration of silica nanoparticles, 10 mL of 1 weight % of the silica nanoparticle solution was diluted to 0.5 weight % with methanol and mixed. Next, 0.5 mL of PEI-silane, amine-silane or GLYMO-silane was added to the solution, along with the same amount of deionized water. The reaction was placed in a 50 degree C. heating mantle and reacted for 12 hours before the as-synthesized nanoparticles were collected. The as-synthesized nanoparticles were used for characterizations without any further treatment.

Figure 9C:
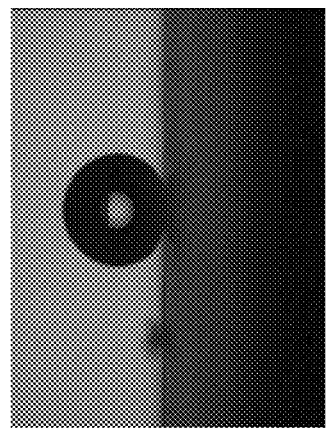
FIGS. 9A-9C are pictorial representations of water drop on a glass surface coated with nanoparticles prepared in accordance with one or more embodiments of the invention.
Figure 9B:
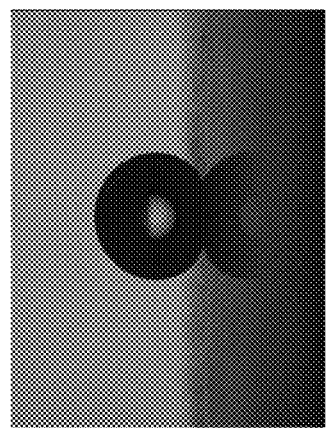
Figure 9A:
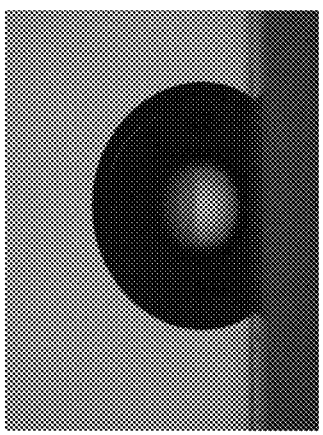

As can be seen in FIGS. 9A-9C, a glass surface was coated with fluoroalkyl functionalized nanoparticles (135 nm) and the respective contact angles with water were 120°, 150°, and 170°.

Figure 10B:
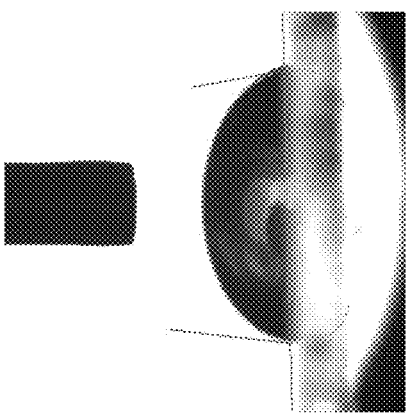
FIGS. 10A and 10B are pictorial representations of decane drop on a glass surface coated with nanoparticles prepared in accordance with one or more embodiments of the invention.
Figure 10A:
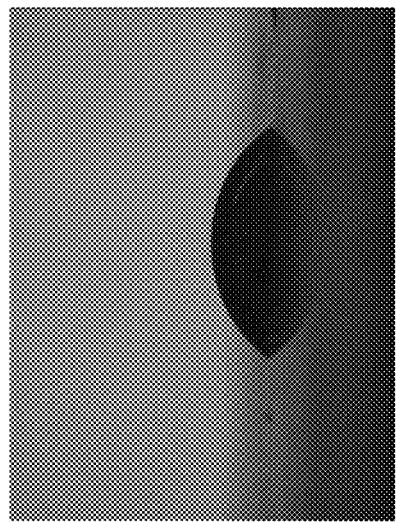

As can be seen in FIGS. 10A and 10B, a glass surface was coated with fluoroalkyl functionalized nanoparticles (135 nm) and the respective contact angles with decane were 54° and 80°.

Figures 11A, 11B:
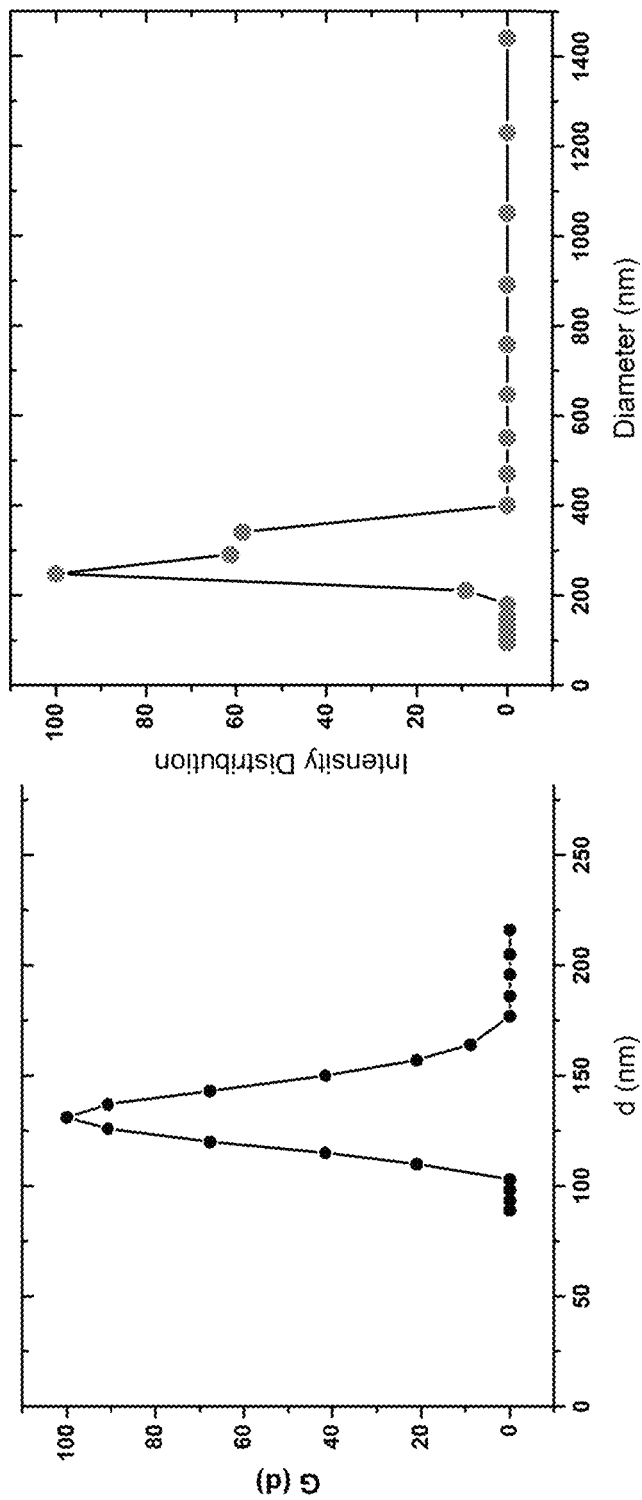
FIGS. 11A and 11B are graphical representations of the size distribution of nanoparticles prepared in accordance with one or more embodiments of the invention.

FIGS. 11A and 11B graphically represent the size distribution of the silica nanoparticles as determined by dynamic light scattering. FIG. 11A represents nanoparticles with a mean diameter of 135 nm. FIG. 11B represents nanoparticles with a mean diameter of 275 nm.

OTHER EMBODIMENTS

Certain embodiments of the present application were described previously. It is, however, expressly noted that the present application is not limited to those embodiments, but rather the intention is that additions and modifications to what was expressly described in the present application are also included within the scope of the application. Moreover, it is to be understood that the features of the various embodiments described in the present application were not mutually exclusive and can exist in various combinations and permutations, even if such combinations or permutations were not made express, without departing from the spirit and scope of the application. Having described certain implementations of methods of mitigating condensate banking, it will now become apparent to one of skill in the art that other implementations incorporating the concepts of the application may be used. Therefore, the application should not be limited to certain implementations, but rather should be limited only by the spirit and scope of the following claims.

We claim:

1. A method for mitigating condensate or water banking in the vicinity of a wellbore for a gas condensate reservoir, the method comprising a step of contacting a rock formation in the vicinity of a wellbore for a gas condensate reservoir with a particle suspension and a step of treating a surface of a rock formation, before the step of contacting, with a solution comprising a rock surface modifier,
wherein:
the particle suspension comprises particles having a surface free energy lower than the rock formation before the contacting step, and each of the particles comprises a chemical moiety (R), and
the rock surface modifier is or comprises an amino-alkyl silane that reacts with hydroxyl groups on the surface of the rock formation, and comprises a chemical moiety (R'),
the chemical moiety (R) comprises an epoxide group,
the chemical moiety (R') comprises an amine group that reacts with the chemical moiety (R) upon contact to form at least one of a covalent bond, an electrostatic bond, or a Van der Waals bond, thereby reducing the surface energy of the rock formation.

2. The method of claim 1 wherein the particle suspension comprises particles with a surface free energy less than 50 mJ/m$^2$.

3. The method of claim 1, wherein the particles comprise perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H,1H,2H,2H-perfloorodecyltriethoxysilane or perfluorodecyltrichlorosilane.

4. The method of claim 1, wherein the particles further comprise a chemical moiety (L) comprising a hydrophobic moiety, an oleophobic moiety and/or an omniphobic moiety.

5. The method of claim 1, wherein the particles comprise inorganic metal oxides, organic particles resins, and/or thermoplastic resins.

6. The method of claim 5, wherein the particles comprise silica, quartz, glass, titania, zirconia, germania, alumina, tantalum pentoxide, zinc oxide, carbon nanotube, graphene, carbon black, mica, graphite, talc, nanoclay, boron nitride, boron nitride nanotubes, vanadium pentaoxide, calcium carbonate, zirconium oxide, titanium oxide, silicon nitride, silicon carbide, copper, tin oxide, iron oxide, titanium oxide, chromium oxide, lead oxide, gypsum, barytes, metal organic frameworks or combinations thereof.

7. The method of claim 1, wherein the particles comprise organic and thermoset resin selected from the group consisting of cross-linked polystyrene particles, crosslinked methacrylate-based polymers particles, phenolic resin, a furan resin, an epoxy resin, a polyurethane, a polyurea, a melamine, and combinations thereof.

8. The method of claim 1, wherein the particles comprise fluorinated silica particles.

9. The method of claim 1, wherein the particles have a mean diameter in a range of about 1 nm to about 1000 nm.

10. The method of claim 1, wherein the rock formation is a sandstone formation, a carbonate formation, a shale formation, a clay rich formation, or combinations thereof.

11. The method of claim 1, where the particle suspension comprises a solvent selected from the group consisting of water, brine, methanol, ethanol, isopropanol, ethylene glycol, butanol, 2-butoxyethanol, butyl carbitol, pentanol, hexanol, terpene alcohols, such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof.

12. The method of claim 1, wherein the rock formation is an unpropped fracture, a propped fracture, a gravel packed completion, a reservoir matrix, or combinations thereof.

13. The method of claim 1, further comprising a step of injecting a pre-flush to prepare the rock surface to receive the nanoparticles.

14. The method of claim 13, wherein the pre-flush comprises a rock surface modifier that comprises the chemical moiety (R') dispersed in a solvent selected from the group consisting of water, brine, methanol, ethanol, isopropanol, ethylene glycol, butanol, 2-butoxyethanol, butyl carbitol, pentanol, hexanol, terpene alcohols, such as terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, and combinations thereof.

15. The method of claim 13, wherein the pre-flush comprises a rock surface modifier that comprises the chemical moiety (R') suspended in fresh or deionized water, 2 wt % KCl, or 6 wt % KCl.

16. The method of claim 15, wherein the pre-flush comprises a chelating agent selected from the group consisting of EDTA, MGDA, GLDA, HEDTA, and combinations thereof, in concentrations from about 0.1 wt % up to about 40 wt %.

17. The method of claim 1, wherein the particle suspension has a particle concentration in a range of 0.001 wt % to about 1 wt %.

18. The method of claim 1, wherein the particle suspension has a particle concentration in a range of about 0.01 wt % to about 0.35 wt %.

19. A system for mitigating condensate banking in the vicinity of a wellbore for a gas condensate reservoir, the system comprising:
a first container or source that comprises a particle suspension, wherein the particle suspension comprises particles with a surface free energy less than less than 50 mJ/m$^2$, and each of the particles comprise a chemical moiety (R);
a second container or source that comprises a solution that comprises a rock surface modifier comprising an amino-alkyl silane that reacts with hydroxyl groups on the surface of the rock formation, and comprises a chemical moiety (R') that reacts with the chemical moiety (R) upon contact to form at least one of a covalent bond, an electrostatic bond, or a Van der Waals bond, wherein the chemical moiety (R) is an epoxide group, and the chemical moiety (R') is an amine group;
one or more conduits for introducing the particle suspension into the rock formation in the vicinity of a wellbore for a gas condensate reservoir; and
one or more conduits for introducing the solution into the rock formation in the vicinity of the wellbore for the gas condensate reservoir.

20. A method for mitigating condensate or water banking in the vicinity of a wellbore for a gas condensate reservoir, the method comprising a step of contacting a rock formation in the vicinity of a wellbore for a gas condensate reservoir with a particle suspension, wherein:
the particle suspension comprises particles having a surface free energy lower than the rock formation before the contacting step, and each of the particles comprises (i) a chemical moiety (R) and (ii) a chemical moiety (L); and
a solution that comprises a rock surface modifier comprising an amino-alkyl silane that reacts with hydroxyl groups on the surface of the rock formation, wherein the surface of the rock formation comprises a chemical moiety (R') that reacts with the chemical moiety (R) upon contact to form at least one of a covalent bond, an electrostatic bond, or a Van der Waals bond, thereby reducing the surface energy of the rock formation, and
wherein (i) the chemical moiety (R) comprises an epoxide group, (ii) the chemical moiety (L) comprises an alkoxysilane or a halosilane, each comprising at least one of fluorine, chlorine, bromine, or iodine, and (iii) the chemical moiety (R') comprises a hydroxyl group or an amine group.

* * * * *